US006413282B1

(12) United States Patent
Tanahashi et al.

(10) Patent No.: US 6,413,282 B1
(45) Date of Patent: Jul. 2, 2002

(54) ELECTROLYTIC CAPACITOR AND METHOD FOR MANUFACTURING THE SAME

(75) Inventors: Masakazu Tanahashi, Osaka; Emiko Igaki, Amagasaki, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/439,285

(22) Filed: Nov. 15, 1999

Related U.S. Application Data

(62) Division of application No. 09/100,040, filed on Jun. 19, 1998, now Pat. No. 6,310,765.

(30) Foreign Application Priority Data

Jun. 20, 1997 (JP) .............................. 9-164001
Nov. 28, 1997 (JP) .............................. 9-327433

(51) Int. Cl.⁷ ............................ H01G 9/00; H01G 9/02; B05D 5/12
(52) U.S. Cl. ...................... 29/25.03; 361/523; 361/525; 427/80
(58) Field of Search ................. 29/25.03; 361/523–525, 361/529–530, 532; 427/80

(56) References Cited

U.S. PATENT DOCUMENTS

| | | | |
|---|---|---|---|
| 5,119,275 A | 6/1992 | Kinuta et al. ............... 361/525 |
| 5,140,502 A | 8/1992 | Kudoh et al. ............... 361/540 |
| 5,189,770 A | 3/1993 | Waidhas et al. ............ 29/25.03 |
| 5,442,197 A | 8/1995 | Andrieu et al. ............. 257/40 |
| 5,457,862 A | * 10/1995 | Sakata et al. ............... 29/25.03 |
| 5,473,503 A | * 12/1995 | Sakata et al. ............... 361/525 |
| 5,538,813 A | 7/1996 | Li ............................... 429/192 |
| 5,626,729 A | 5/1997 | Thompson et al. ......... 204/252 |
| 5,754,394 A | * 5/1998 | Evans et al. ................ 361/516 |

FOREIGN PATENT DOCUMENTS

| | | |
|---|---|---|
| JP | 64-31409 | 2/1989 |
| JP | 2-186617 | 7/1990 |
| JP | 4-87317 | 3/1992 |
| JP | 4-364018 | 12/1992 |
| JP | 5-13286 | 1/1993 |
| JP | 6-132178 | 5/1994 |
| JP | 6-168855 | 6/1994 |
| JP | 8-83735 | 3/1996 |

* cited by examiner

*Primary Examiner*—Ha Tran Nguyen
(74) *Attorney, Agent, or Firm*—Wenderoth, Lind & Ponack, L.L.P.

(57) ABSTRACT

The invention has an object to reduce the impedance and to improve the responsiveness at high frequencies in an electrolytic capacitor having an conducting polymer layer as the cathode. A cathode current collector is directly joined with the surface of the dielectric of a valvular metal porous body for anode using an conducting polymer layer but not through various binding layers (for example, a carbon layer and a silver layer) thereby reducing the impedance. A cathode current collector is disposed adjacent and opposite to a porous valvular metal foil for anode. This structure ensures that the collecting area is enlarged. In this case, a cathode current collector may be directly joined with the surface of the dielectric of a valvular metal porous body for anode using an conducting polymer layer but not through various binding layers thereby reducing the total impedance.

28 Claims, 12 Drawing Sheets

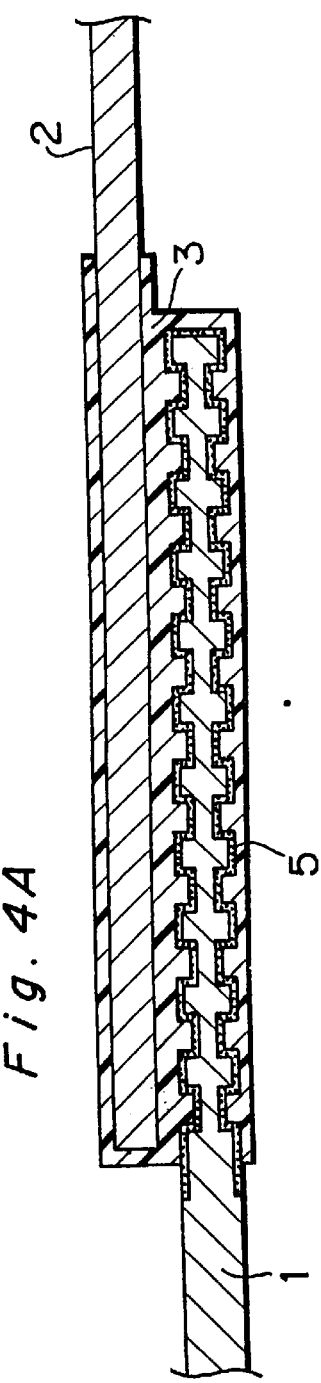
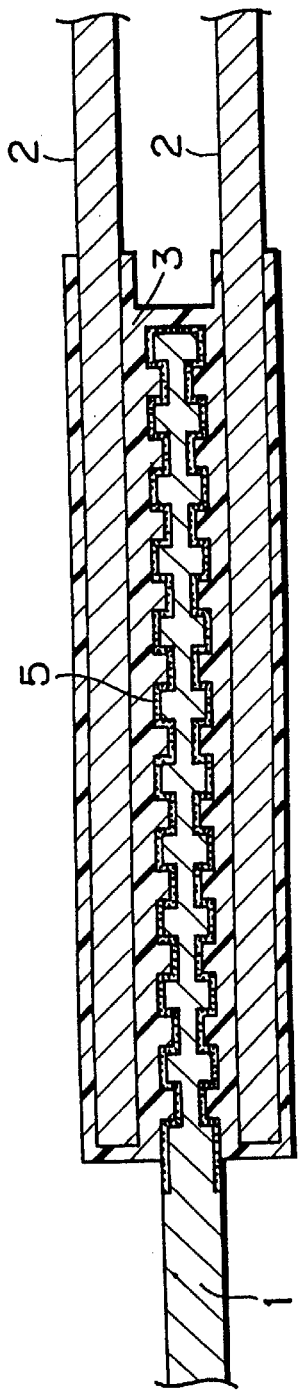
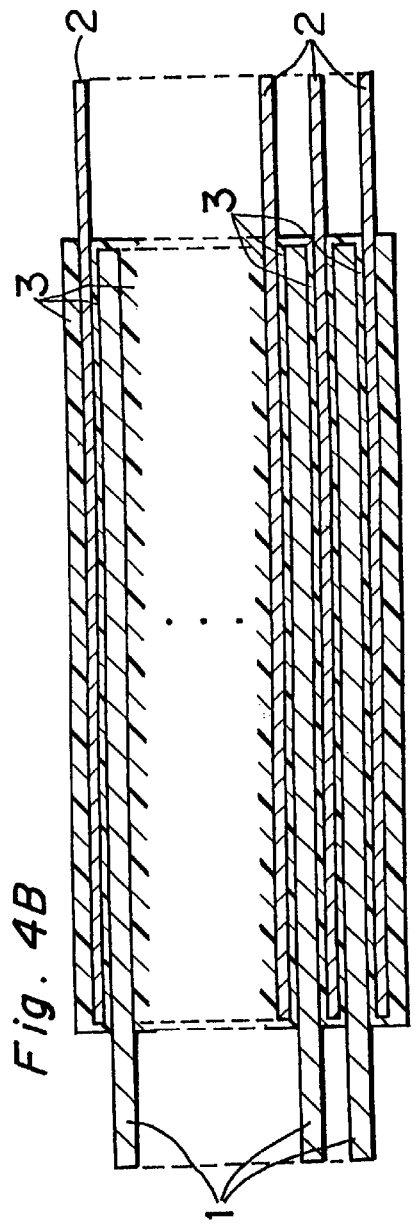
Fig. 4A
Fig. 4B

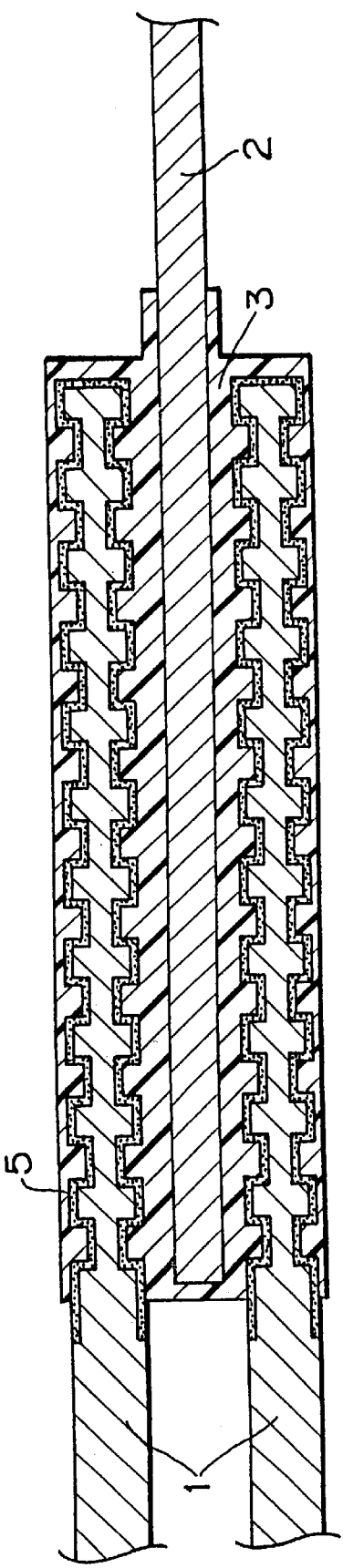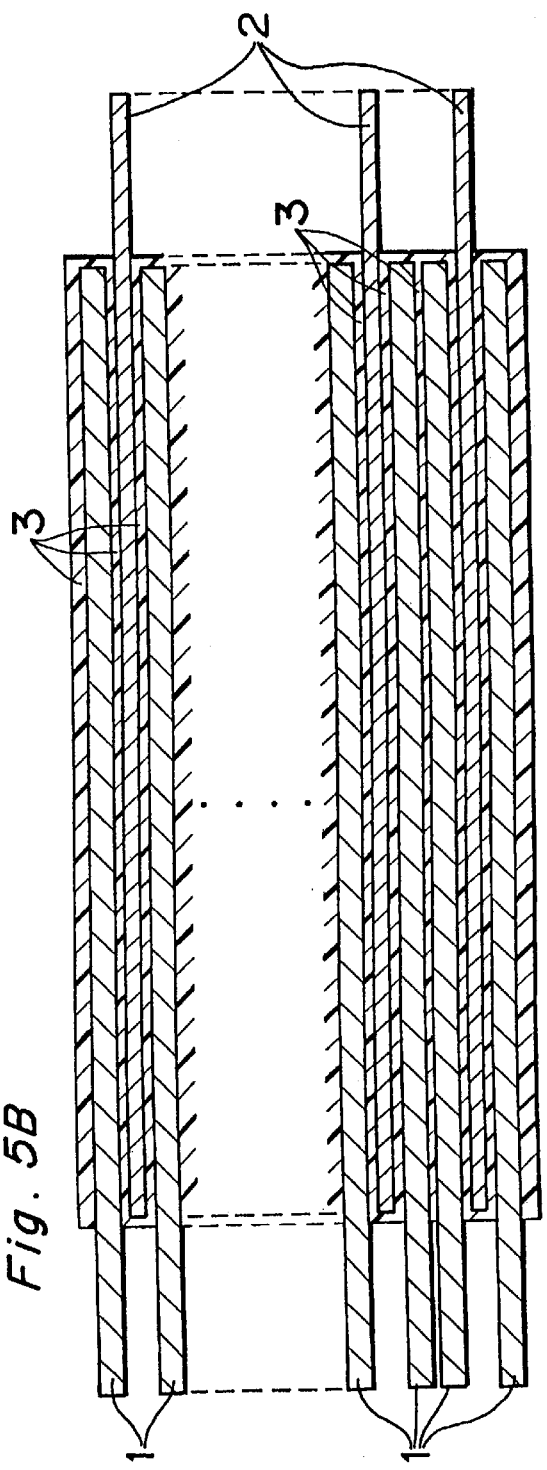

ELECTROLYTIC CAPACITOR AND METHOD FOR MANUFACTURING THE SAME

This is a divisional application of Ser. No. 09/100,040, filed Jun. 19, 1998, now U.S. Pat. No. 6,310,765.

BACKGROUND OF THE INVENTION

1. Field of the Invention

The present invention relates to an electrolytic capacitor using a metal having a valvular action, such as aluminum, tantalum, or the like, as the anode, a coating layer formed of an oxide of the valvular metal as the dielectric, and an conducting polymer layer as the cathode. The present invention also relates to a method for manufacturing such an electrolytic capacitor.

2. Prior Art

Customary electrolytic capacitors using a valvular metal, e.g. aluminum, tantalum, are generally fabricated using a valvular metal porous body as an anode element, a coating layer of an oxide of the valvular metal which is formed as the dielectric layer on the porous surfaces and external surface of the porous body, and an liquid electrolyte or inorganic solid electrolyte as the cathode. In addition to the above, a current collector connecting to the anode and the cathode and finally a casing are formed. As the cathode, for example, an organic solvent including an organic acid or the like is used in the aluminum electrolytic capacitor and manganese dioxide or the like for the tantalum electrolytic capacitor.

High responsiveness at high frequencies has been demanded of electronic parts along with the digitization of circuits. It is therefore required for the electrolytic capacitors to be improved in the high responsiveness at high frequencies by a reduction in electric resistance passing through the capacitor. In this situation, the use of a highly conducting polymer as a solid electrolyte for the cathode has been studied and developed.

The electrolytic capacitor has the structural feature in which an oxide layer is formed on the surface of pores of porous valvular metal as the dielectric layer and the valvular metal remaining as the core is used as the anode. When forming the cathode in the capacitor element, it is therefore necessary to coat the surface of very intricate internal pores of the porous element with a conducting polymer in an efficient manner.

In the case of producing a solid electrolyte for the cathode from the conducting polymer by an electrolytic oxidation polymerization method, the following method is used to coat, with the conducting polymer, the surface of the dielectric layer formed on the pore surfaces of the very intricate porous element in an efficient manner. Specifically, a conducting precoat layer is formed in advance on the surface of the insulating dielectric layer. An electrode used for electrolytic oxidation polymerization is allowed to be in contact with the surface of the precoat layer. A solution containing a monomer to be polymerized into an conducting polymer is introduced. An conducting polymer layer is formed by polymerization on the entire surface of the dielectric using the precoat layer as the anode. Then, the electrode for electrolytic oxidation polymerization is removed. On the other hand, as the chemical oxidation polymerization method is utilized, a monomer is allowed to be in contact with an oxidizer capable of oxidizing and polymerizing the monomer on the coating of the dielectric layer to form an conducting polymer layer on the entire surface of the dielectric layer.

In the case where the cathode electrolyte is a solid, a method has been adopted in which an conducting adhesive layers consisting of a carbon paste layer and particulate silver paste layer is interposed between the solid electrolyte layer (manganese dioxide layer or conducting polymer layer) and a current collector for cathode to combine the electrolyte layer with the collector metal.

Such a method is disclosed in Japanese Patent Publication JP-A 6-168855, in which the current collector for cathode is disposed close to the periphery of the valvular metal element. In case of, for example, a aluminum-laminating capacitor, the current collector for cathode is disposed close to any one or all of the side faces and upper and lower faces of the laminated body as shown in FIG. 13.

There have been used a method of disposing the cathode current collectors between the aluminum layers in the aluminum laminated capacitors. Japanese Patent Publication JP-A 4-306427 discloses a method of joining the cathode current collector directly to the conducting polymer layer as a anode.

The aforementioned capacitors having such a structure can only insufficiently reduce in impedance even if it uses a highly conducting polymer as the cathode and hence poses the problem of low responsiveness at high frequencies. This is because various layers are interposed to combine the current collector for cathode with the conducting polymer and also because the surface area of the current collector for cathode is small so that the surface contact resistance cannot be reduced. This is because the natural oxide coating is formed on the surface of the current collector, causing the surface not to reduce in contact resistance.

SUMMARY OF THE INVENTION

An object of the present invention is to provide an electrolytic capacitor capable of reducing in resistance of the junction between the current collector for cathode and the conducting polymer, and ensuring high responsiveness of the capacitor at high frequencies.

Another object of the present invention is to miniaturize the capacitor having such characteristics.

The above objects of the present invention can be attained by the provision of an electrolytic capacitor in which the cathode current collector has a roughened surface, a thin carbon layer on the surface, or carbon particles in the surface embedded in the surface, at least on the side facing the conducting polymer layer.

The capacitor of the invention comprises an anode formed of a valvular metal into a porous body, a dielectric oxide layer formed on the entire surfaces of the valvular metal porous body including the pore surfaces, a cathode composed of an conducting polymer layer formed on the dielectric oxide layer, an anode current collector which is electrically connected to an internal metal section of the body, and a cathode current collector which is electrically connected to the cathode, wherein the cathode current collector is a plate or foil of metal provided with the said surface properties and physically joined directly to the conducting polymer layer.

Particularly, in this structure in which such a cathode current collector is directly joined to the dielectric oxide layer using an conducting polymer without interposing various combining layers, such as a carbon paste layer and a silver paste layer, between the cathode current collector and the conducting polymer layer is intended to reduce the contact resistance between them thereby reducing the total impedance and miniaturizing the capacitor.

In the electrolytic capacitor of the present invention, the cathode current collector may be provided with a elastic film of rubber or resin the on the face opposite to the side facing the valvular metal porous body. This structure makes it possible to relieve a stress applied after the formation of the conducting polymer layer whereby a highly reliable capacitor reduced in the occurrence of a short of a circuit and the like.

In the electrolytic capacitor of the present invention, the cathode current collector may be produced by forming a metal thin film on a plastic film. This gives an effective result that the impedance is reduced and that if the circuit would short, a metal thin film of the shorted circuit would vanish whereby the original characteristics would be restored.

In the electrolytic capacitor of the present invention, the cathode current collector may be a part of a casing for packaging a capacitor element. This structure serves to miniaturize the capacitor.

In the electrolytic capacitor of the present invention, the valvular metal porous body of the anode is a porous valvular metal foil and the cathode is disposed so as to oppose one face or both faces of the valvular metal foil and is laminated or wound up. This structure in which the cathode current collector is disposed close to the valvular metal foil for anode ensures that, in addition to the above effect, the collecting area is enlarged, the conducting path of the conducting polymer can be shortened, and the impedance can be reduced.

In the electrolytic capacitor, the porous valvular metal foil as a anode is disposed so as to face both surfaces of the cathode current collector and is laminated or wound. This structure ensures that the impedance can be reduced and the volumetric capacitance can be increased.

In the electrolytic capacitor of the present invention, the cathode current collector may be formed with a number of through-holes penetrating from the surface to backface of a plate or foil, and the valvular metal foil for the anode may be formed with a number of through holes penetrating through the foil. Any one of these structures enables it possible to improve the adhesion of the conducting polymer layer to the cathode current collector or the anode foil and thereby to provide a highly reliable capacitor.

According to a further aspect of the present invention, there is provided a method for manufacturing an electrolytic capacitor comprising of:

a step of forming a dielectric oxide layer on the surface of a porous body formed of a valvular metal and the entire surface of pores;

a step of mounting the porous body on a metal sheet of the cathode current collector having a roughened surface, a thin carbon layer on the surface, or carbon particles in the surface embedded in the surface, at least on the side facing the conducting polymer layer; and a step of forming an conducting polymer layer on the dielectric layer. In the invention, the valvular metal porous body may have any one of a foil form and a block form (including a laminated and wound types).

The space between the cathode current collector and the dielectric oxide layer can be filled only with the conducting polymer layer by forming the conducting polymer layer after the valvular metal porous body mounted on the cathode current collector.

In the invention, the valvular metal porous body on which the conducting polymer layer is formed in advance may be mounted on the cathode current collector.

In the method for manufacturing of the present invention, an conducting polymer layer may be further interposed between the porous body and the cathode current collector after the step of mounting, on the cathode current collector, the valvular metal porous body on which the conducting polymer layer is formed. The adhesion of the cathode current collector to the conducting polymer formed on the valvular metal porous body is thereby improved contributing to a reduction in the impedance.

The method for manufacturing the electrolytic capacitor of the present invention may include the following method: Specifically, the cathode current collector is a valvular metal foil provided with an oxide layer. The valvular metal anode foil and the cathode foil are integrated into a structure by laminating or winding up the both foils via a separator. An electrode for electrolytic oxidation polymerization is disposed on the entire end perpendicular to the both foils and the separator. An conducting polymer is allowed to grow inside the structure from the electrode by electrolytic oxidation polymerization to coat the inside of pores of the porous structure. A uniform conducting polymer layer can be simply formed by electrolytic oxidation polymerization.

BRIEF DESCRIPTION OF THE DRAWINGS

In the accompanying drawings, there are shown illustrative embodiments of the invention from which these other of its objectives, novel features, and advantages will be readily apparent.

In the drawings:

FIGS. 4A and 4B are sectional views showing a structure of an unit electrolytic capacitor and multilayer electrolytic capacitor of further different embodiment;

FIGS. 5A and 5B are sectional views showing a structure of an unit electrolytic capacitor and multilayer electrolytic capacitor of further different embodiment, similarly to FIGS. 4A and 4B respectively;

DETAILED DESCRIPTION OF THE INVENTION AND PREFERRED EMBODIMENTS

The present invention will now be explained in detail.

An electrolytic capacitor according to the present invention comprises an anode formed of a valvular metal, a dielectric layer which is a layer of an oxide of the valvular metal, and a cathode formed of an conducting polymer layer. In the present invention, the anode is formed with a great number of pores a part of which open to the external surface in the inside thereof and has therefore a remarkably enlarged surface area. Preferably tantalum or aluminum may be utilized as the valvular metal.

The dielectric layer is a remarkably thin oxide coated layer on the surfaces of the anode including the surfaces of the pores formed inside the porous body. The oxide layer may be formed by chemical conversion treatment of the valvular metal in an electrolyte.

The conducting polymer layer is applied to the dielectric layer including internal pores to then constitute the cathode. The conducting polymer layer is a polymer layer in which a polymer itself polymerized from a monomer exhibits electroconductivity. As the conducting polymer, a polymer of a heterocyclic five-membered ring compound, preferably polymers of pyrrole, thiophene, 3-alkylthiophene, or isothionaphthene or its derivative is used. As the conducting polymer, polymers of a six-membered ring compound or its derivative may be used and examples of these polymers include polyparaphenylene, polyparaphenylenevinylene, and polyaniline.

In order to increase the electroconductivity of the polymer and thereby to decrease the resistance of the polymer layer, the conducting polymer preferably contains a dopant. Preferably arylsulfonic acid ions such as an alkylnaphthalenesuofonic acid ion or paratoluenesulfonic acid ion or arylphosphoric acid ions can be used as the dopant for the above conducting polymer.

In order to form the polymer layer on the dielectric layer, the present invention adopts a method in which a solution containing the monomer is introduced on the dielectric oxide layer and the monomer is polymerized in the solution by chemical or electrolytic oxidation. Also, in the electrolytic capacitor of the invention the cathode current collector is designed to be a plate or foil form and is physically connected directly to the conducting polymer layer.

Figure 3A:
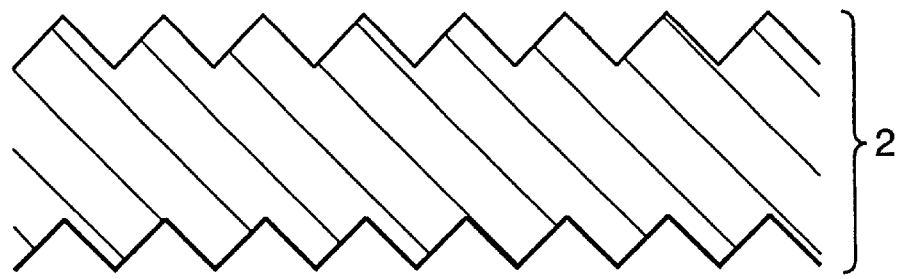
FIGS. 3A, 3B, and 3C are sectional views showing a structure of cathode current collector in the invention.
Figure 3B:
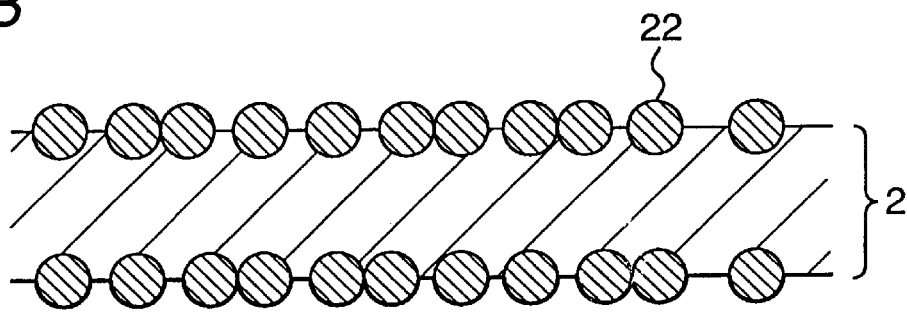
Figure 3C:
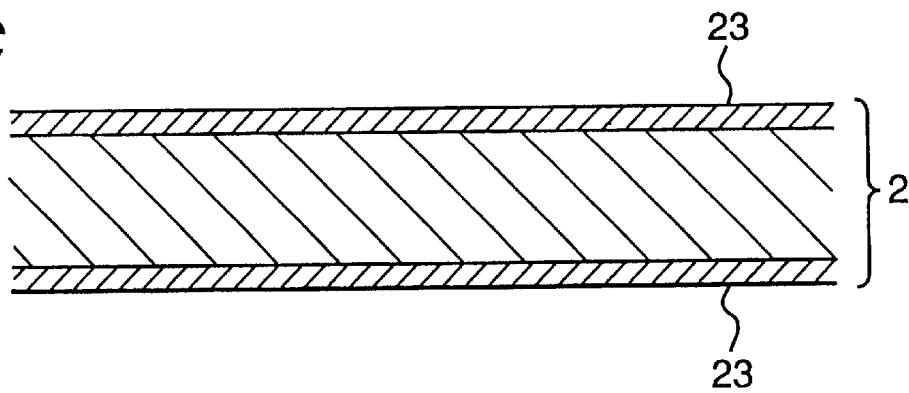

The cathode current collector should have a roughened surface as shown in FIG. 3A, a surface provided with a carbon layer in FIG. 3B, or a surface provided with carbon particles embedded surface, as shown in FIG. 3C, on one side facing to the conducting polymer layer. The cathode metal foil is directly joined to the dielectric oxide layer using an conducting polymer without interposing various combining layers (a carbon layer and a silver paste layer), obtaining the reduced contact resistance between the cathode foil and the conducting polymer layer with whole lower impedance. Also, this structure is free from various joint layers, the volumetric efficiency is improved and the capacitor is therefore miniaturized.

Figure 1A:
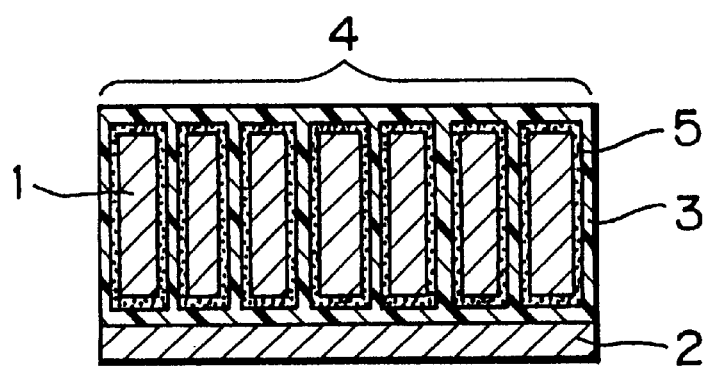
FIGS. 1A, 1B and 1C are sectional views showing various structures of electrolytic capacitors of a first embodiment according to the present invention and a structure of a cathode current collector on which a resin film is formed.

Specifically, in an electrolytic capacitor of a first embodiment according to the present invention, as shown in FIG. 1A, the valvular metal porous body 4 comprises an anode structure produced by laminating or winding a porous valvular metal foil 1 and the cathode current collector 2 is, disposed perpendicular to the valvular metal foil 1.

Figure 1B:
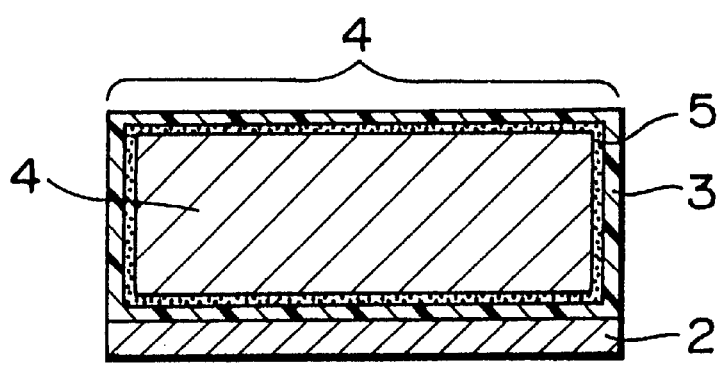

In an electrolytic capacitor of a second embodiment according to the present invention, the valvular metal porous body 4, for example as shown in FIG. 1B, is constituted of an anode structure produced by sintering a valvular metal powder and is disposed on the cathode current collector 2.

Figure 1C:
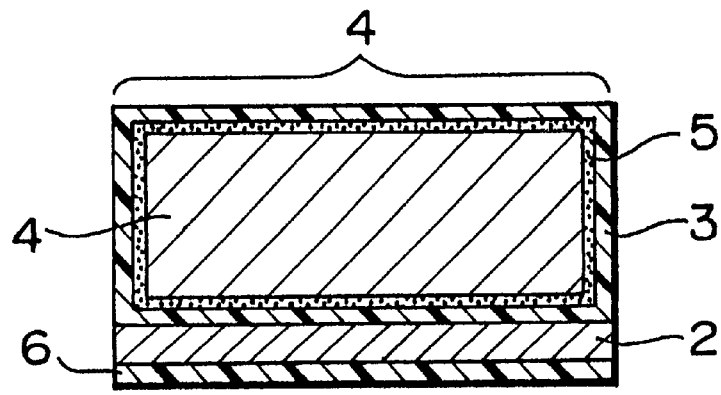

In this electrolytic capacitor, not only the entire surface of the dielectric layer is coated with the conducting polymer layer but also the cathode current collector is applied to the surface of the dielectric layer using only the conducting polymer layer. Thus the aforementioned effects is obtained such that the minimum impedance at high frequencies which corresponds to the equivalent series resistance can be reduced to about ⅔ of that of a customary electrolytic capacitor and the electrolytic capacitor with a high responsiveness at high frequencies can be provided. In this case, as shown in FIG. 1C, it is desirable that the cathode current collector 2 be provided with a elastic film 6 of rubber or resin on the face opposite to the side facing the vulvular metal porous body 4. This structure enables it possible to relieve a stress and other defects after formation of the conducting polymer whereby a highly reliable capacitor reduced in the occurrence of a short circuit and the like can be provided. The rate of occurrence of short circuits is reduced to ½ of that of a customary electrolytic capacitor.

It is particularly preferable that the cathode current collector be a part of a casing for packaging a capacitor element. The cathode current collector itself is utilized as an outer packaging in a simple manner whereby the occupancy of the capacitor element in the casing be increased, which contributes to an achievement of further miniaturization and increased capacitance.

A material used for the cathode current collector is preferably any one of materials selected from nickel, copper, stainless, aluminum, which itself has a low specific resistance and low ionic migration. In addition, the material used for cathode current collector is preferably provided with carbon particles buried into the material and projected into the surface. The material may be provided a carbon layer formed on the surface. The conducting polymer layer can be directly connected to the carbon particles or carbon layer of the cathode current collector without interrupted by the natural oxide coating on the metal surface. The surface resistance between the conducting polymer and the cathode current collector is thus reduced. Also, an electrolytic capacitor with a low resistance and high responsiveness at high frequencies can be provided.

It is preferable that the cathode current collector be a metal foil whose surface is roughened or a porous metal foil whereby the surface resistance between the conducting polymer layer and the cathode current collector is reduced and a lower impedance results.

The cathode current collector is formed with a number of through-holes penetrating from the surface to backface thereof. The cathode current collector is easily joined with the anode of the valvular metal porous body through the conducting polymer layer and the adhesion of the cathode current collector to the valvular metal porous body is improved. A highly reliable electrolytic capacitor can be completed. In this case, a metal net or a punching metal may be used as a metal for cathode current collector.

Particularly when the conducting polymer layer is formed by a chemical oxidation polymerization method in a lump after the anode of the valvular metal porous body is attached to the cathode current collector, the provision of the through-pores has an advantage that the conducting layer can be entirely and uniformly formed.

Figure 2:
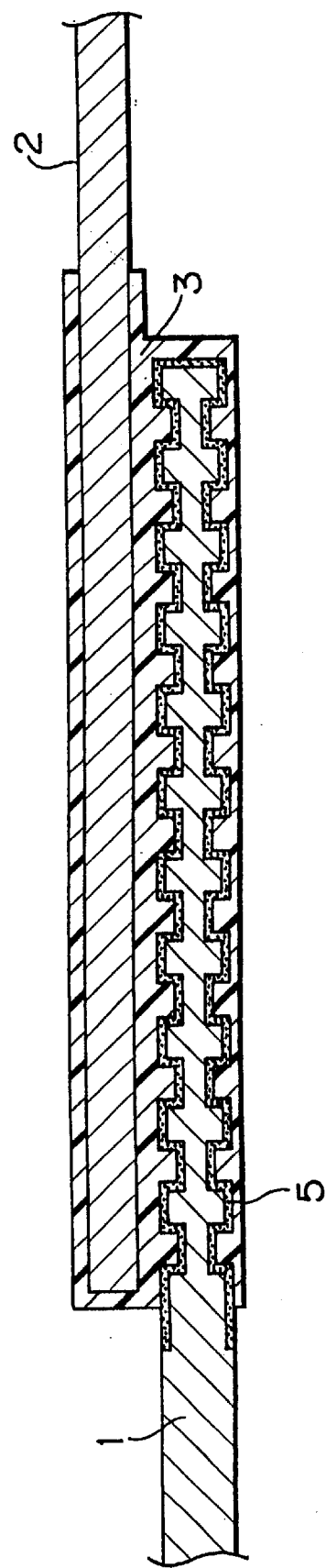
FIG. 2 is a sectional view showing a unit of an electrolytic capacitor of a second embodiment according to the present invention.

In an electrolytic capacitor of a third embodiment according to the present invention, as shown in FIG. 2, an electrolytic capacitor unit is designed in which a porous valvular metal foil 1 is used as the valvular metal porous body for anode, the cathode current collector 2 is disposed so as to face one of the surfaces of the valvular metal foil 1, and the dielectric layer 5 of the metal oxide layer over the valvular metal foil 1 is close to the cathode current collector 2 through the conducting polymer layer 3. The cathode current collector 2 is disposed adjacent to and facing the anodes made of the valvular metal foil 1, thereby reducing the whole impedance. Particularly the minimum impedance at high frequencies which corresponds to the equivalent series resistance is reduced to about ½ or lower of that of a customary electrolytic capacitor. This ensures a provision of an electrolytic capacitor with a high responsiveness at high frequencies.

A structure such as an electrolytic capacitor of a forth embodiment according to the present invention as shown in FIGS. 4A and 4B also has the same effects as those of the electrolytic capacitors of the third and fourth embodiments on a reduction of the impedance. Specifically, in the structure, a porous valvular metal foil 1 is used as the valvular metal porous body for anode. The porous valvular metal foil 1 has a multilayer structure and the cathode current collectors 2 are disposed so as to face both surfaces of each of the valvular metal foils. The dielectric layer of the metal oxide coated on the valvular metal foil is closed to the cathode current collectors through the conducting polymer layer.

In an electrolytic capacitor of a sixth embodiment according to the present invention, as shown in FIGS. 5A and 5B, an electrolytic capacitor unit is designed in which a porous valvular metal foil 1 is used as the valvular metal porous body for anode, one sheet of cathode current collector 2 being interposed between the two sheets of valvular metal foil, and the valvular metal foil is joined with the cathode current collector 2 through the conducting polymer layer 3. A structure in FIG. 5B in which one or more units of the capacitor are laminated is adopted whereby the impedance is reduced more greatly and the volumetric capacitance is increased more largely than a conventional electrolytic capacitor.

In this case, in order to collect the cathode current from the side-not facing the cathode current collector, it is preferable that the valvular metal porous body for anode has a great number of the through holes penetrating the body.

A porous aluminum foil produced by carrying out A.C. etching in an electrolyte may be used as the cathode current collector.

It is preferable that the cathode current collector is a thin metal film attached on a plastic film. This structure gives an effective result that if the circuit would short, a metal thin film of the shorted circuit would vanish whereby the original characteristics would be restored.

In the third or fifth embodiment where the valvular metal foil for anode is allowed to oppose the cathode current collector via a separator, a good electrolytic capacitor with a low current leakage is obtained.

It is also desirable that the valvular metal foil for anode be formed with a number of through-pores penetrating from the surface to backface of the foil. Because reactive materials easily move even if any one of a chemical oxidation polymerization method and electrolytic oxidation method is used, the cathode current collector is easily united with the valvular metal foil for anode via the conducting polymer layer whereby the adhesion of the cathode current collector to the valvular metal foil is improved and a highly reliable electrolytic capacitor is manufactured and provided in a stable manner.

The cathode current collector may be formed with a number of through-pores penetrating from the surface to backface thereof. The cathode current collector is easily joined with the anode of the valvular metal porous body through the conducting polymer layer and the adhesion of the cathode current collector to the valvular metal porous body is improved. A highly reliable electrolytic capacitor can be completed. In this case, a metal net or a punching metal may be used as a metal for cathode current collector having a number of through-pores.

Particularly when the conducting polymer layer is formed by a chemical oxidation polymerization method in a lump after the anode of the valvular metal porous body is attached to the cathode current collector, the provision of the through-pores has an advantage that the conducting polymer layer can be entirely and uniformly formed and the developing rate of capacitance is thereby improved.

An electrolytic capacitor of an sixth embodiment according to the present invention uses a porous valvular metal foil as the valvular metal porous body for anode and a valvular metal foil which is roughened in the surface and treated by chemical conversion process at a voltage of 1 to 5 V as the cathode current collector with a structure in which the anode foil and the cathode foil being laminated or wound up via a separator and the conducting polymer is formed by electrolytic oxidation polymerization.

An electrolytic capacitor of a seventh embodiment according to the present invention uses a porous valvular metal foil as the valvular metal porous body for anode and, as the cathode current collector, a porous valvular metal foil on which a dielectric oxide layer of the same type as above is formed with non polarity and a structure in which the anode foil and the cathode foil being laminated or wound up via a separator and the conducting polymer is formed by electrolytic oxidation polymerization.

Though all of these electrolytic capacitors 6 and 7 have the same configurations as customary solution- and wound-type electrolytic capacitors, these capacitors have the effect of decreasing the impedance more greatly than conventional electrolytic capacitors. In addition, since a valvular metal with an oxide layer is used as the cathode, a uniform conducting polymer is produced when it is grown from the electrode used for electrolytic oxidation polymerization.

In these electrolytic capacitors of the first and the third to seventh embodiments, an aluminum foil etched in an electrolyte or a sheet foil produced by shaping a tantalum powder into a sheet from followed by annealing may be used as the porous valvular metal foil.

Also in the electrolytic capacitors of the sixth and seventh embodiments, preferably the porous metal foil for anode is formed with a number of through-pores penetrating from the surface to backface of the foil. This enables the cathode foil to be easily united with the anode foil whereby the adhesion between the both is improved and highly reliable electrolytic capacitor is manufactured and provided in a stable manner.

In order to produce the above electrolytic capacitors, the following various production methods may be utilized. In these production methods, a tantalum or aluminum valvular metal is preferably used.

The methods of the following first to sixth embodiments for producing an electrolytic capacitor correspond to the case where the valvular metal porous body is an anode structure formed by laminating or winding up a metal foil, or by shaping a valvular metal powder followed by annealing, or the case where the valvular metal porous body is a porous valvular metal foil.

In a production method of a first embodiment, a dielectric oxide layer is formed on the surface of a porous body composed of a valvular metal and the pore surface of pores and then a plate or foil cathode current collector is roughened on the surface or buried with carbon particles in the surface or covered by a carbon layer over the surface, and is attached to the porous body in a manner that it is fixed in accordance with a prescribed positional relation between them. The porous body with the collector is soaked in a solution containing a monomer which will be polymerized into an conducting polymer. Using the cathode current collector as the anode for electrolytic oxidation polymerization and a separate electrode disposed in the solution as the cathode, current is allowed to flow between the both electrodes. The current is controlled so as to flow through the solution existing in the pores of the porous body. The current allows the monomer to be polymerized by an anode oxidation on the cathode current collector and the polymer grows directly into an conducting polymer layer. Since the produced conducting polymer layer allows current to pass therethrough, the monomer is polymerized at the terminal of the growing polymer. An conducting polymer layer is continuously formed in the pores formed inside the valvular metal porous body. The dielectric layer formed inside the pores can be directly joined to the cathode current collector via the conducting polymer. The electrolytic capacitor according to the present invention is thus produced.

Figure 6A:
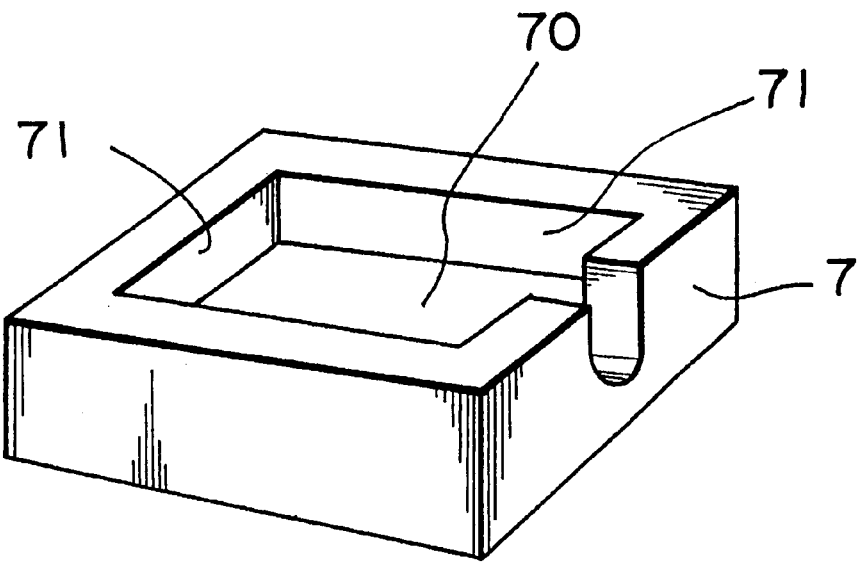
FIG. 6A shows a profile of a casing for containing a capacitor element in forming the conducting polymer layer by polymerizing.
Figure 6B:
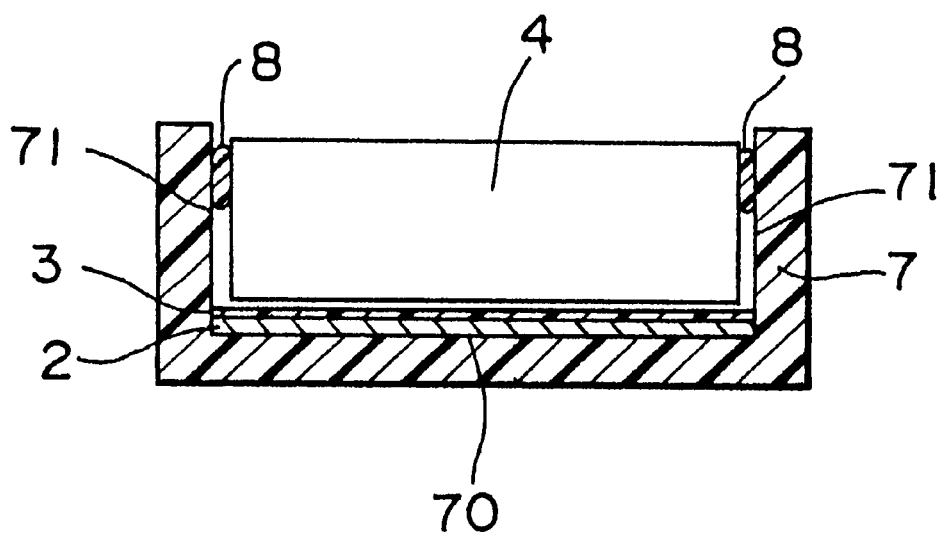
FIG. 6B shows a view of condition in which a valvular tantalum porous body together with a cathode current collector is secured to the casing to perform electrolytic oxidation polymerization in an example according to the present invention.

In the present invention, an efficient flow of current into the monomer solution within the through-pores of the porous body is of importance. In order to attain this object, it is desirable that the cathode for polymerization in the solution be positioned so as to oppose the porous body with the collector (the anode for polymerization) for cathode, at least the external surface of the collector be insulated, and current be allowed to flow through only the inside of the porous body. Even if the valvular metal porous body is a sintered block, laminated or wound body of a foil, or a foil, it is dealt with in the same manner. When the valvular metal porous body is, for example, a sintered block as shown in FIGS. 6(A) and 6(B), it is desirable that a cathode current collector 2 be disposed on the inside bottom of a casing 7 formed of an insulating material, for example, a synthetic resin or ceramics, a porous body 4 is disposed in the casing and fixed using a sealed material 8, and current be allowed to flow through the pores of the porous body, to form an conducting polymer layer.

Figure 9:
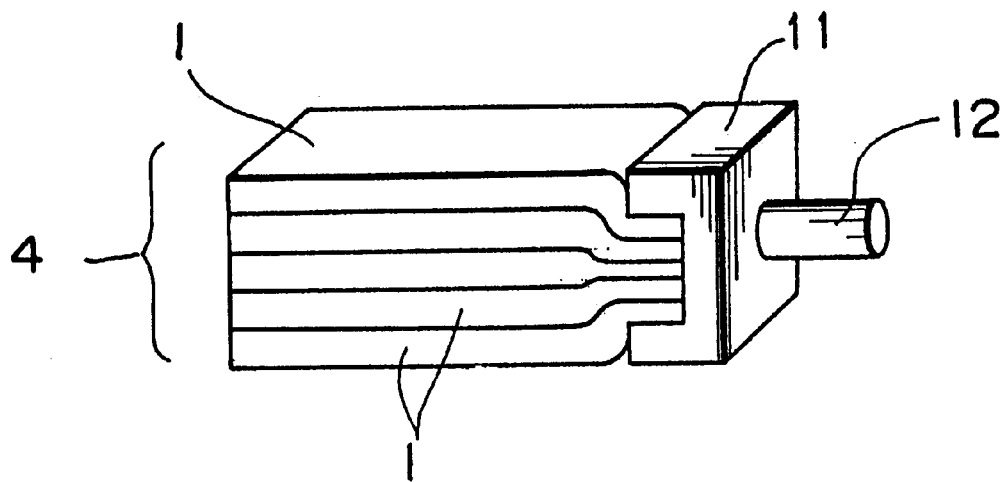
FIG. 9 is a view showing a porous aluminum electrolytic capacitor in another example according to the present invention.
Figure 10:
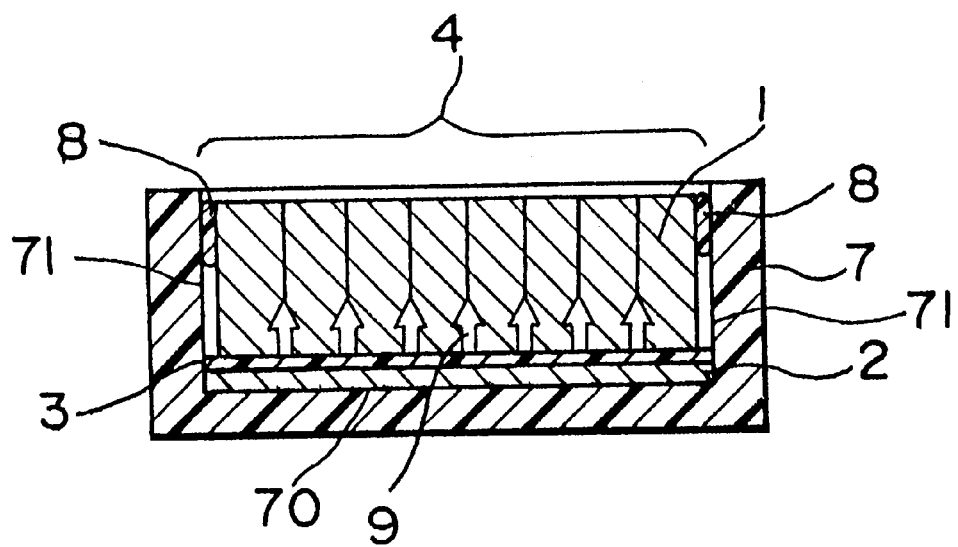
FIG. 10 is a schematic sectional view showing a condition of forming an conducting polymer layer by polymerizing the monomer in the aluminum porous electrolytic capacitor in the example according to the present invention.

When the valvular metal porous body is an anode structure formed by laminating and winding up a porous valvular metal foil, for example as shown in FIGS. 9 and 10, preferably the cathode is disposed perpendicular to the valvular metal foil. An conducting polymer layer can be formed on the entire surface of the porous body with ease.

In this case, the casing may be used as an outer packaging case for securing a capacitor as it is. The cathode current collector constitutes a part of the packaging case for storing the capacitor porous body in this manner whereby the occupancy of the capacitor porous body in the casing can be increased, which contributes to an achievement of further miniaturization and increased capacitance.

If a thin conducting polymer layer is formed in advance on the surface of the dielectric layer by chemical oxidation polymerization, an conducting polymer is homogeneously formed so that even the deep portion of pores can be coated with an conducting polymer and the developing rate of capacitance is thereby improved.

The thin conducting polymer layer formed in advance is preferably produced in the solution excluding an organic acid -type whereby the conducting polymer can be more homogeneous and the developing rate of the capacitor is further improved.

Preferably an conducting polymer is formed in advance on the surface of the cathode current collector. The occurrence of a short circuit can be thereby decreased. In the case where a foil-type valvular metal porous body is used, a separator is interposed between the cathode current collector and the valvular metal foil for anode when the porous body is attached to the cathode current collector, thereby reducing the occurrence of a short circuit.

When the valvular porous body is a foil, a unit mounted with the cathode current collector may be laminated or wound after the conducting polymer layer is formed.

In a production method of a second embodiment according to the present invention, a dielectric oxide layer is formed on the surface of a porous body composed of a valvular metal and on the pore surface of pores and an conducting precoat layer is then applied to the surface of the dielectric oxide layer. No particular limitations is imposed on the types of precoat layer insofar as it is an conducting layer formed on the dielectric oxide layer. Even an conducting thin film formed by chemical oxidation polymerization and even a manganese dioxide layer formed by a thermal decomposition method may be used. Next, the porous body is soaked in a solution containing a monomer which will be polymerized into an conducting polymer. A third electrode is brought into contact with the precoat layer and current is allowed to flow through the third electrode so that the precoat layer acts as an anode. This makes it possible to flow current into the pores of the porous body through the solution using the precoat layer as the anode, whereby an conducting polymer layer can be formed on the precoat layer by electrolytic oxidation polymerization. The porous body on which the conducting polymer layer is formed is attached to a plate or foil cathode current collector to produce an electrolytic capacitor according to the present invention.

Even if the valvular metal porous body is a sintered block, laminated or wound body of a foil, or a foil, it is dealt with in the same manner. When the valvular porous body is a foil, a unit mounted with the cathode current collector may be laminated or wound.

Preferably a clearance between the conducting polymer layer and the cathode current collector is further filled with an conducting polymer layer using an electrolytic oxidation polymerization method or a chemical oxidation polymerization method after the porous body on which the conducting polymer layer is attached to the cathode current collector. Alternatively, the clearance may be filled with a soluble conducting polymer or a thermoplastic conducting polymer. The adhesion of the cathode current collector to the conducting polymer on the surface of the dielectric is improved and the responsiveness at high frequencies is more improved.

A method is also preferably used in which at least the most upper layer of the conducting polymer layers is composed of an elastic conducting polymer layer (polythiophene or the like) when an conducting polymer layer is formed on the porous body on which the dielectric oxide layer is formed, thereby improving the adhesion after the porous body is attached to the cathode current collector.

Furthermore, an conducting polymer layer is formed in advance on the surface of the cathode current collector, and preferably at least the most upper layer of the conducting layers is composed of an elastic conducting polymer layer. The effective result that the adhesion of the cathode current collector to the surface of the dielectric is improved is thereby obtained.

In a production method of a third embodiment according to the present invention, an electrolytic capacitor according to the present invention is produced in the same manner as in the first embodiment except that the conducting polymer layer is produced by a method in which a porous body mounted with a collector is soaked in a solution containing a monomer, which will be polymerized into an conducting polymer, to form an conducting polymer layer on the dielectric oxide layer by a chemical oxidation polymerization method.

At this time, the chemical oxidation polymerization may be performed by a known process in which the porous body is soaked alternately in a solution containing an oxidizer and a solution containing a monomer or in which the porous body is soaked in a solution containing both an oxidizer and a monomer.

Even if the valvular metal porous body is a sintered block, laminated or wound body of a foil, or a foil, it is dealt with in the same manner. When the valvular porous body is a foil, a unit mounted with a cathode current collector may be laminated or wound.

Preferably an conducting polymer is formed in advance on the surface of the cathode current collector. The occurrence of a short circuit can be thereby decreased in the same manner as above. In the case where a foil-type valvular metal porous body is used, a separator is interposed between the cathode current collector and the valvular metal foil for anode when the porous body is attached to the cathode current collector, thereby further reducing the occurrence of a short circuit.

In a production method of a fourth embodiment according to the present invention, an electrolytic capacitor according to the present invention is produced in the same manner as in the second embodiment except that the conducting polymer layer is produced by a method in which a porous body is soaked in a solution containing a monomer, which will be polymerized into an conducting polymer, to form an conducting polymer layer on the dielectric oxide layer by a chemical oxidation polymerization method.

Even if the valvular metal porous body is a sintered block, laminated or wound body of a foil, or a foil, it is dealt with in the same manner. When the valvular porous body is a foil, a unit mounted with a cathode current collector may be laminated or wound. Similarly to the above, there are no limitations to the chemical oxidation polymerization method.

The method is also preferably used in which a clearance between the conducting polymer layer and the cathode current collector is further filled with an conducting polymer. The method in which the most upper layer of the conducting polymer layers is softened is also preferably utilized.

In a production method of a fifth embodiment according to the present invention, an electrolytic capacitor according to the present invention is produced in the same manner as in the first embodiment except that the conducting polymer layer is produced by a method in which a soluble conducting polymer or a thermoplastic conducting polymer is introduced on the dielectric oxide layer to form an conducting polymer layer on the dielectric oxide layer.

Even if the valvular metal porous body is a sintered block, laminated or wound body of a foil, or a foil, it is dealt with in the same manner. When the valvular porous body is a foil, a unit mounted with a cathode current collector may be laminated or wound.

Preferably an conducting polymer is formed in advance on the surface of the cathode current collector. The same effect as above is obtained. In the case where a foil-type valvular metal porous body is used, a separator is interposed between the cathode current collector and the valvular metal foil for anode when the porous body is attached to the cathode current collector, thereby further reducing the occurrence of a short circuit.

In a production method of a sixth embodiment according to the present invention, an electrolytic capacitor according to the present invention is produced in the same manner as in the second embodiment except that the conducting polymer layer is produced by a method in which a soluble conducting polymer or a thermoplastic conducting polymer is introduced on the dielectric oxide layer to form an conducting polymer layer on the dielectric oxide layer.

Even if the valvular metal porous body is a sintered block, laminated or wound body of a foil, or a foil, it is dealt with in the same manner. When the valvular porous body is a foil, a unit mounted with a cathode current collector may be laminated or wound.

The method is also preferably used in which a clearance between the conducting polymer layer and the cathode current collector is further filled with an conducting polymer. The method in which the most upper layer of the conducting polymer layers is softened is also preferably utilized.

In these methods of the first to sixth embodiments, the valvular metal porous body may be anode structures formed by laminating or winding a porous valvular metal foil, anode structures formed by shaping a valvular metal powder followed by annealing, or porous valvular metal foils. When the valvular metal porous body is an anode structure formed by laminating or winding a porous valvular metal foil, the cathode current collector is preferably disposed perpendicular to the valvular metal foil, whereby the conducting path of the conducting polymer can be mostly shortened, and the impedance can be reduced.

A production method of a seventh embodiment directs to a method for manufacturing an electrolytic capacitor having a structure in which the valvular metal porous body for anode is a porous valvular metal foil, the cathode current collector is a valvular metal foil produced by chemical conversion process performed at a voltage of 1 to 5 V, and an anode and a cathode are laminated or wound via a separator.

Figure 11:
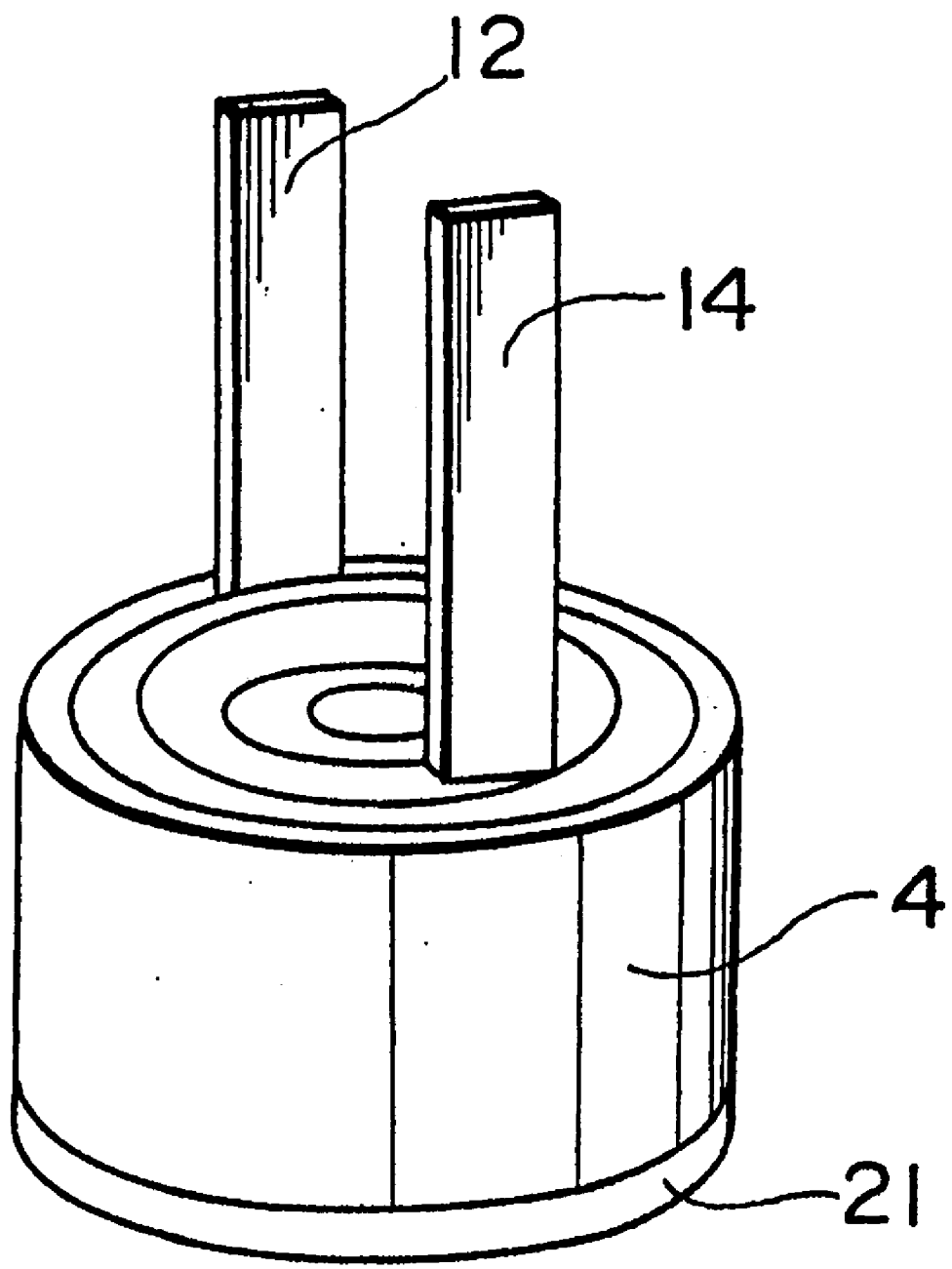
FIG. 11 is a view showing a wound-type electrolytic capacitor provided with a metal plate attached to the bottom thereof, the metal plate being used as an electrode for polymerization, in a further example according to the present invention.

First, a dielectric oxide layer is formed on the surface of the porous valvular metal foil for anode and the entire surface of pores. On the other hand, the valvular metal foil for cathode is treated by chemical conversion process at a voltage of 1 to 5 V. Then, the both foils are laminated or wound via a separator and, for example as shown in FIG. 11, an electrode for electrolytic oxidation polymerization is installed on the entire end perpendicular to the both foils and the separator. After that, the valvular metal porous structure equipped with an electrode is soaked in a solution containing a monomer which will be polymerized into an conducting polymer. Using the equipped electrode as the anode for electrolytic oxidation polymerization, current is allowed to flow through the internal clearance of the porous structure in the same manner as in the method of the first embodiment. An conducting polymer layer is grown by electrolytic oxidation polymerization to coat the pores of the porous structure thereby producing an electrolytic capacitor according to the present invention.

A production method of an eighth embodiment according to the present invention directs to a method for manufacturing a non-polar electrolytic capacitor having a structure in which the valvular metal porous body for anode is a porous valvular metal foil, the cathode current collector is a porous valvular metal foil formed with a dielectric oxide layer of the same type, and the both foils are laminated and wound via a separator.

In this production method, first a dielectric oxide layer is formed on the surface of the porous valvular metal foil and on the pore surface of pores. In succession, the valvular metal foil formed with the dielectric oxide layer is laminated and wound. Subsequent steps are carried out in the same manner as in the seventh embodiment to produce an electrolytic capacitor according to the present invention.

In any one of the production methods of the seventh and eight embodiments for producing wound-type and laminated-type electrolytic capacitors, the dielectric layer can be joined and united with the cathode foil through the conducting polymer layer with ease. A capacitor with a low impedance and a large capacitance can be obtained. Also, a capacitor can be provided which can prevent a deterioration due to the dissipation of a solvent which is a drawback of a liquid aluminum electrolytic capacitor.

In these production methods of the seventh and eighth embodiments, preferably an conducting polymer thin layer is formed in advance on the surface of the dielectric by a chemical oxidation polymerization method. An conducting polymer is homogeneously formed so that even the deep portion of pores can be coated with the conducting polymer and the developing rate of capacitance is thereby improved.

In this invention, an inner metal section of the dielectric oxide layer formed on the surface of the valvular metal porous body is electrically connected to the anode current collector to provide a part of an electrolytic capacitor. Furthermore, the anode current collector and the cathode current collector are electrically connected to an external electrode for the anode and an external electrode for the cathode respectively to provide a part of an electrolytic capacitor.

EXAMPLES

The present invention will be explained in more detail by way of examples, which are not intended to be limiting of the present invention.

Example 1

This example relates to a method for producing a polar tantalum electrolytic capacitor. First, a tantalum powder with a lead was compression-molded and annealed under a high vacuum to prepare a tantalum porous body. In succession, the annealed body was treated by a chemical conversion process in an aqueous sulfuric acid solution at a voltage of 30 V to produce a tantalum electrolytic capacitor element.

In the production of the tantalum electrolytic capacitor according to the present invention, as shown in FIGS. 6A and 6B, first a nickel plate as an cathode current collector 2 was disposed on the rectangular internal bottom of a casing 7 prior to a step of forming a cathode of polypyrrole used as the conducting polymer.

The cathode current collector of nickel foil was formed by burying carbon particles of 5 $\mu$m in diameter into the surface by roll pressing. On this cathode current collector, polypyrrole containing an arylnaphthalenesulfonic acid as a dopant was deposited in advance by electrolytic oxidation polymerization to form a densified conducting polymer layer 3 with a thickness of about 20 $\mu$m. A porous body element 4 of the above tantalum annealed body was disposed on the conducting polymer layer 3 of the cathode current collector 2. The clearance between the external surface of the element 4 and the side face 71 of the casing 7 was sealed using an adhesive sealing agent 8 made of a synthetic resin to insulate the side face of the element 4.

Figure 7:
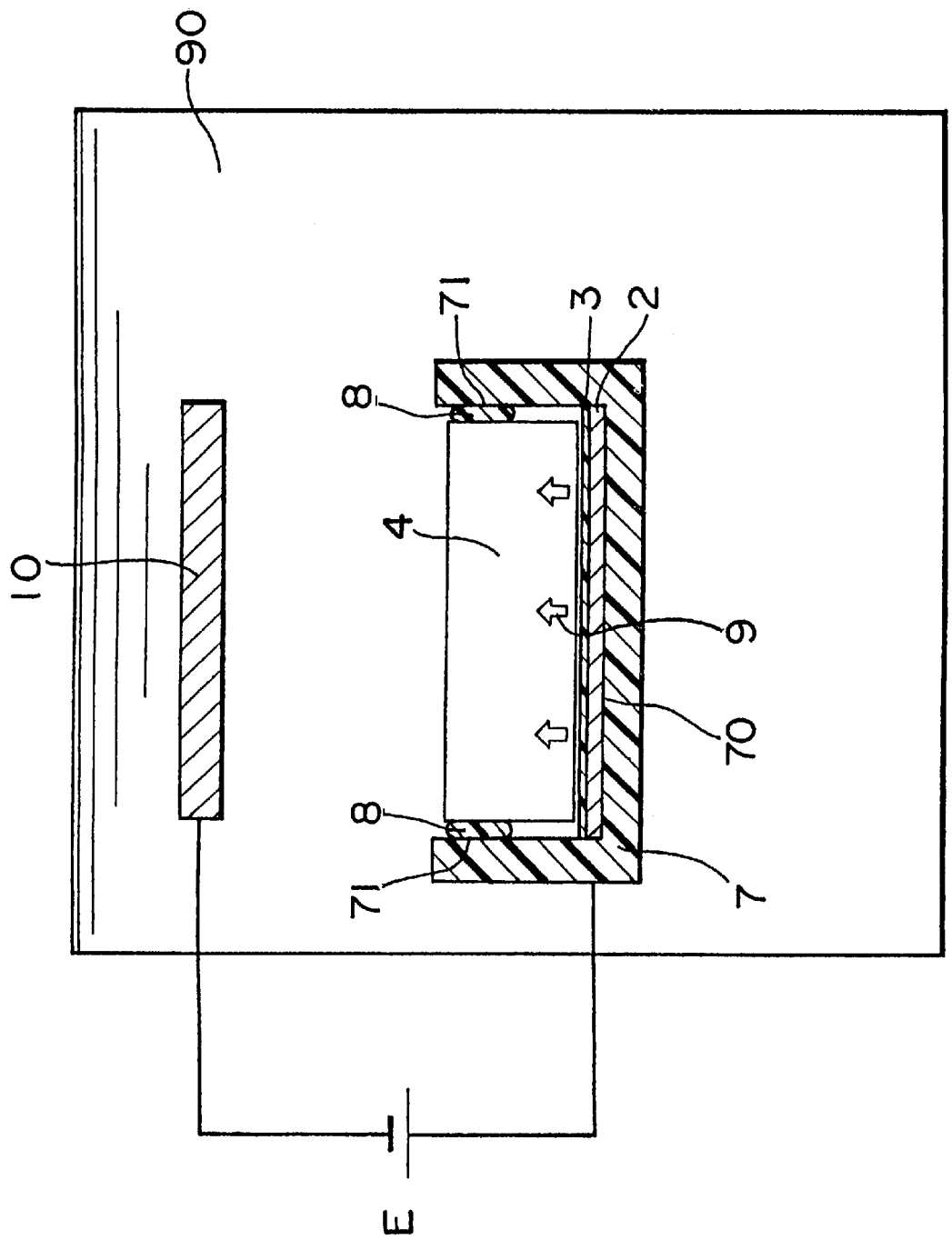
FIG. 7 is a sectional view illustrating a method in which the tantalum porous body in a casing is treated by electrolytic oxidation polymerization to form a conducting polymer in the example according to the present invention.

Next, a mixed solution of an alcohol and propylene carbonate containing pyrrole as a polymerizing monomer and an arylnaphthalenesulfonic acid ion as a dopant was prepared. As shown in FIG. 7, the tantalum porous body element 4 was soaked in the mixed solution 90 to allow pores of the tantalum porous body element 4 to be impregnated with the solution. Then, using the cathode current collector 2 as the anode, current was allowed to flow between the anode and a platinum electrode which was the counter electrode 10 disposed in the solution 90 to grow an conducting pyrrole layer (The symbol 9 represents an arrow showing this condition) by polymerization further on the conducting polymer layer 3 formed in advance on the cathode current collector 2. The polypyrrole layer produced by electrolytic oxidation polymerization served to bind the cathode current collector 2 with the capacitor porous body element 4 and was used to coat the pores formed inside the porous body thereby producing the cathode of the tantalum electrolytic capacitor. After that, the upper face (the side opposite to the cathode current collector 2) was sealed with a resin plate using an epoxy resin adhesive to manufacture a polar tantalum electrolytic capacitor.

For Comparative Example 1, which was intended to manufacture a conventional tantalum capacitor, a porous body element which was treated at the same time by chemical conversion treatments was subjected repetitive thermal decomposition using manganese nitrate in the same manner as in the conventional method to form an electrolytic layer of manganese dioxide on the inner to external surfaces of the element. In succession, a carbon paste was applied to the surface and successively a silver paste on the carbon paste followed by connecting to a cathode lead and coating with a package resin to manufacture a conventional tantalum electrolytic capacitor.

For Comparative Example 2, which was intended to manufacture a conventional tantalum capacitor using an conducting polymer as the cathode, a porous body element which was treated at the same time by chemical conversion treatments was soaked alternately in a solution containing a monomer and in a solution containing an oxidizer according to a general chemical oxidation polymerization method to form an conducting polymer layer. In succession, a carbon paste was applied to the surface and successively a silver paste on the carbon paste followed by connecting to a cathode lead and coating with a package resin to manufacture a conventional tantalum electrolytic capacitor.

For comparative Example 3, the tantalum electrolytic capacitor was produced in the same manner as Example 1 except nickel plate was not contained carbon particles.

Figure 8:
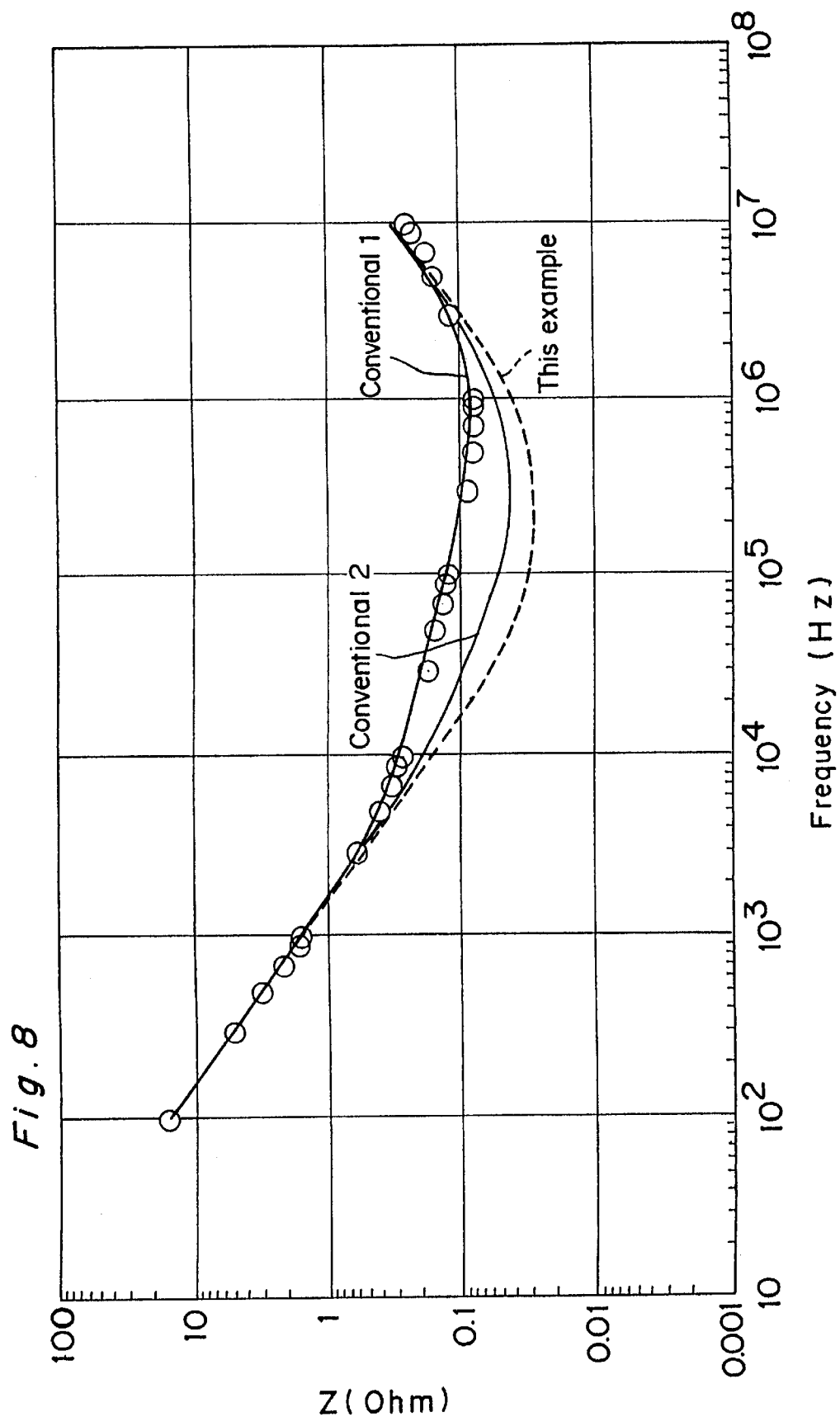
FIG. 8 is a graph showing a change in impedance for the tantalum electrolytic capacitor relative to frequency with in the example of the present invention.

Each of the tantalum electrolytic capacitors prepared in the above manners was subjected to measurements of the capacitance at 120 Hz and frequency characteristic of impedance. The results of measurement of impedance are shown in FIG. 8.

The results of measurement of capacitance shows that the capacitors using the manganese dioxide electrolyte and conducting polymer which were manufactured by conventional methods had a capacitance of about 95 $\mu$F. On the other hand, the capacitor produced by the electrolytic oxidation polymerization method had a capacitance of as low as about 73 $\mu$F exhibiting a low developing rate of capacitance, but, as shown in FIG. 8, was improved in the impedance, and, specifically, the impedance was reduced to ¼ and ⅔ of those of capacitors using the manganese dioxide electrolyte and conducting polymer manufactured by conventional methods. The impedance of the capacitor was lowered to about two third that of the capacitor without carbon particles on the nickel foil surface.

Example 2

This example relates also to a method for producing a polar tantalum electrolytic capacitor. In this example, an conducting polymer thin film of pyrrole was formed in advance by chemical oxidation polymerization inside the tantalum element which had been treated by chemical conversion treatment to prepare a sample tantalum element. The formation of the pyrrole film was performed according to the following method:

First, pyrrole was dissolved in an aqueous solution containing 10% by volume of isopropyl alcohol in a manner that the proportion of pyrrole was 0.1 mol/l to prepare a monomer solution. Iron sulfate (III) was dissolved in an aqueous solution containing 10% by volume of isopropyl alcohol in a manner that the proportion of iron sulfate was 0.1 mol/l to prepare an oxidizer solution. These monomer solution and the oxidizer solution were mixed to prepare a mixed solution. The capacitor element was soaked in the mixed solution to form a polypyrrole film on the dielectric layer formed inside pores and on the surface of the capacitor element by chemical conversion polymerization.

The sample prepared in the above manner was treated by electrolytic oxidation polymerization in the same manner as in the Example 1 to form a polypyrrole film thereby producing a capacitor. As a consequence, only the capacitance increased to 96 $\mu$F while other characteristics are the same as those of the capacitor produced using polypyrrole in Example 1. A capacitor having the same capacitance as conventional tantalum capacitors, a low impedance and high responsiveness at high frequencies was obtained.

A conventional tantalum electrolytic capacitor with cathode current collector consisting of carbon paste and silver paste exhibited a rating of 100 $\mu$F at 10 V in a D size (88 mm$^3$) whereas the tantalum capacitor of the present invention with the same rating had a size of 4.5 mm' 3.2 mm' 3.0 mm (43 mm$^3$). The volume of the tantalum electrolytic capacitor of the present invention is reduced to about ½ of that of the conventional tantalum electrolytic capacitor.

Example 3

The thin conducting polymer layer formed in advance is preferably produced in the solution excluding an organic acid -type whereby the conducting polymer can be more homogeneous and the developing rate of the capacitor is further improved.

Preferably a conducting polymer is formed in advance on the surface of the cathode collector. The occurrence of a short circuit can be thereby decreased. In the case where a foil-type valvular metal porous body is used, a separator is interposed between the cathode collector and the valvular metal foil for anode when the porous body is attached to the cathode collector, thereby reducing the occurrence of a short circuit.

In a production method of a second embodiment according to the present invention, a dielectric oxide layer is formed on the surface of a porous body composed of a valvular metal and on the pore surface of pores and an conducting precoat layer is then applied to the surface of the dielectric oxide layer. No particular limitations is imposed on the types of precoat layer insofar as it is an conducting layer formed on the dielectric oxide layer. Even an conducting thin film formed by chemical oxidation polymerization and even a manganese dioxide layer formed by a thermal decomposition method may be used. Next, the porous body is soaked in a solution containing a monomer which will be polymerized into an conducting polymer. A third electrode is brought into contact with the precoat layer and current is allowed to flow through the third electrode so that the precoat layer acts as an anode. This makes it possible to flow current into the pores of the porous body through the solution using the precoat layer as the anode, whereby an conducting polymer layer can be formed on the precoat layer by electrolytic oxidation polymerization. The porous body on which the conducting polymer layer is formed is attached to a plate or foil cathode collector to produce an electrolytic capacitor according to the present invention.

As a result, an electrolytic capacitor having the same capacitance and impedance characteristic as in Example 2 was produced.

In this example, the conducting polymer layer is formed in the pores of the porous body by chemical oxidation polymerization thereby coating the surface of the pores with the conducting polymer. It is clear that the same effect will be obtained when using an electrolytic oxidation method generally used and when the surface of the pores of the porous body are coated with a soluble or thermoplastic conducting polymer.

It was also confirmed that, as shown in FIG. 1C, when using a cathode current collector provided with a elastic rubber or plastic film on the surface opposite to that facing the porous body, stresses in the subsequent steps could be relieved. As a consequence, the short circuit in the resulting electrolytic capacitor using the elastic film occurred at a rate of 0% whereas the short circuit of that using no resin film occurred at a rate of about 1%.

Example 4

This example relates to a production method of a polar aluminum electrolytic capacitor.

As shown in FIG. 9, an etched aluminum foil for low voltage, as a porous valvular metal foil 1, with a thickness of 100 $\mu$m, which was AC-etched was laminated and bonded under pressure together with and using an aluminum metal plate 11 formed with a lead 12 to form a valvular metal laminated porous body 4 thereby producing an aluminum capacitor element.

After this element was treated by chemical conversion treatment at a voltage of 30 V in an aqueous phosphoric acid-type solution, a chemical oxidation polymer thin film of polypyrrole was formed on the dielectric layer formed in the inside and on the surface of the element in the same manner as in Example 2.

Next, as shown in FIG. 10, a cathode current collector 2 of a nickel plate was disposed on the inner surface of a casing 7.

In the case, the surface of the nickel plate was roughed on the surface by sand blasting, which was disposed not to face the inner surface of the casing.

Then for conducting polymer layer 3, soft polythiophene layer and polypyrrole layer on the nickel plate by electrolytic oxidation polymerization. The above capacitor element 4 was disposed on the conducting polymer layer in such a manner that the laminated plane of the element 4 is perpendicular to the bottom of the casing 7. In this condition, a clearance between the element 4 and the casing 7 was sealed using a sealing agent 8.

Then, a polypyrrole layer was polymerized and grown (as shown by an arrow 9 in FIG. 10) to manufacture an electrolytic capacitor with a capacitance of about 70 $\mu$F. As shown in FIG. 10, an electrolytic oxidation polymer film was allowed to grow from the plane perpendicular to the laminated plane in the direction parallel to the laminated plane in order to flow current and to secure the path for diffusing the monomer.

As a consequence, the capacitance was 71 $\mu$F on the average and the impedance at the resonance point was 30 m$\Omega$, which value was very small compared to that (generally 1 m$\Omega$) of a conventional aluminum electrolytic capacitor.

In this example, the short circuit in the resulting capacitor having polythiophene layer occurred at a rate of 0% whereas in the capacitance without polythiophene layer short circuit was at rate about 5%. The effect of reducing impedance was obtained when the cathode current collector had the surface area about three times as large as the appearance area.

Example 5

This example relates to a production method of a polar aluminum electrolytic capacitor, and especially, to an electrolytic capacitor in which the anode valvular metal porous body is composed of a porous foil and the cathode current collector is disposed opposite to the anode foil.

An etched aluminum foil for low voltage with a thickness of 100 $\mu$m, which was AC etched, was treated by chemical conversion treatment at a voltage of 15 V in an aqueous phosphoric acid-type solution to form a dielectric layer. The chemically treated aluminum foil was soaked in an alcohol solution (polymerizing solution) containing 0.5 mol/l of a thiophene-type monomer and 1 mol/l of iron paratoluenesulfonate whereby the aluminum foil was impregnated with the solution. The aluminum foil was then lifted up into air and heated to 60° C. to form an conducting polymer by polymerization. This dipping, impregnation, and reaction processes were repeated 10 times to form an conducting polymer layer on the surface of the dielectric film of the aluminum foil. The aluminum foil on which the conducting polymer layer and a Ni roughened foil with a roughened thickness of 10 $\mu$m as the cathode current collector, both surfaces of the Ni foil being coated in advance with an conducting polymer layer of pyrrole-type, were laminated so as to face each other. The laminated foils were soaked in the same solution as above to allow the solution to penetrate into a clearance between the both foils. The temperature was raised to promote the reaction thereby forming a thiophene-type conducting polymer film in the clearance between the both and these dipping and reaction steps were also repeated five times.

Five electrolytic capacitor units produced in this manner were laminated. After aluminum metal portions for leading an anode were connected by press, aluminum metal portions and Ni foils as cathode were led out from each of the units. Then the units were molded using a resin. External electrodes for electrically connecting to the aluminum and nickel electrodes were then formed to manufacture an electrolytic capacitor.

Figure 13:
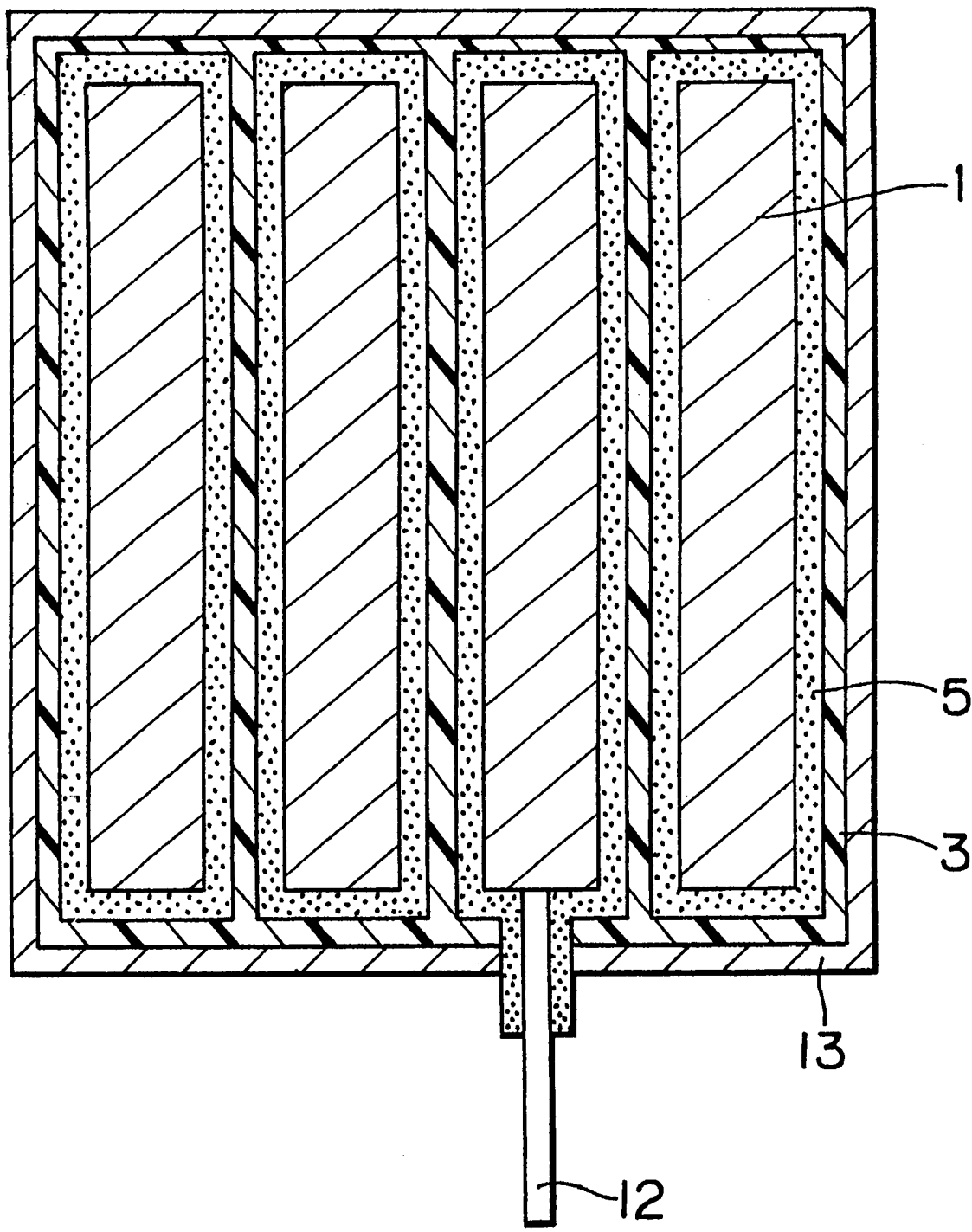
FIG. 13 is a sectional view showing a conventional structure of a electrolytic capacitor in an example.

For comparison, an example of a conventional capacitor was produced according to the following method: Specifically, only five aluminum foils on which an conducting polymer layer had been formed in the same manner as above were laminated. An conducting polymer layer was again formed on the laminated aluminum foils to unite all of the cathodes. Then, as shown in FIG. 13, a carbon paste layer and a Ag paste layer (an conducting layer 13) for leading out the cathodes were formed on the external periphery of the cathodes of the laminated structure to connect electrically to cathode terminals. As the anode, the aluminum metal portions were pressed to be combined each other. Next, the laminated structure was molded using a resin in such a manner that the cathode terminals and the anode aluminum were led out. Then external electrodes for electrically connecting to the led electrodes were formed to manufacture an electrolytic capacitor.

In this example, the external surface of a sheet of aluminum foil used in any electrolytic capacitor was 3.3 mm' 3.7 mm in size.

In order to evaluate the responsiveness of each of the prepared electrolytic capacitors at high frequencies, the developing rate of capacitance at high frequencies to that at low frequencies, and the impedance at high frequencies corresponding to the equivalent series resistance were measured.

The capacitance of the prepared electrolytic capacitors were about 50 $\mu$F at 120 Hz. However, at 100 kHz, the capacitance of the capacitor prepared in conventional example was 12 $\mu$F (the developing rate of capacitance: 24%) whereas the capacitance of the capacitor according to the present invention was 47 $\mu$F (the developing rate of capacitance: 94%). At 400 kHz, the impedance of the capacitor prepared in conventional example was 30 m$\Omega$ whereas the impedance of the capacitor according to the present invention was 10 m$\Omega$. The impedance of the capacitor produced in the same manner as in Example 5 without etching the foil was 20 m$\Omega$. As is clear from the above, it is confirmed that according to the present invention, the impedance can be reduced and the developing rate of capacitance was improved particularly at high frequencies.

Also in this example, the conducting polymer is formed by a chemical oxidation polymerization method. It is clear that the same effect can be obtained even if any one of various forming methods is used.

Further, in this example, after an conducting polymer layer is formed in advance, the valvular metal anode foil on which the conducting polymer layer is formed and the cathode current collector are disposed at prescribed positions and an conducting polymer layer is formed in the clearance between the both. It was confirmed that the same effect was obtained even if an conducting polymer layer was formed in a lump on the dielectric layer and in the clearance between the anode foil on which no conducting polymer layer was formed and the cathode current collector after the both were disposed at prescribed positions. In this case, the anode foil and the cathode current collector are preferably formed with through-holes.

In this example, a Ni roughened foil is used as the cathode current collector. A porous aluminum foil obtained by AC etching in an electrolyte may be used. It is also confirmed that the same effect was obtained even if a foil produced by embedding carbon particles or carbon fibers into a metal foil such as nickel, stainless, or aluminum or a foil produced by forming a carbon layer on the surface of each of various metal foils was used. In addition, it was also confirmed that when these foils were formed with through-holes, separation of the conducting polymer layer from the metal foil could be prevented and the reliability was improved.

In this example, a thiophene-type monomer is used as the monomer. No particular limitations is imposed on the types of monomer insofar as it has electroconductivity.

In this example, also a paratoluenesulfonic acid ion is used as the dopant. Other than the above dopant, even arylsulfonic acid ion or aryl phosphoric acid ion could impart the same effect.

Example 6

This example relates to a production method of a polar aluminum electrolytic capacitor. An etched aluminum foil for low voltage with a thickness of 100 $\mu$m, which was AC-etched, was treated by chemical conversion treatment at a voltage of 15 V in an aqueous phosphoric acid-type solution to form a dielectric layer.

On the other hand, a metal foil was prepared as the cathode current collector, which was produced by vapor-depositing aluminum on both surfaces of a plastic film formed with through-pores and by vapor depositing carbon on deposited aluminum. A pyrrole-and polythiophene type polymer layer containing an alkylnaphthalenesulfonic acid ion as a dopant was formed in advance on the metal foil by electrolytic polymerization.

Next, five chemically treated aluminum foils and five cathode metal foils provided with a plastic film were alternately laminated. In succession, the metal portion of aluminum foils for leading the anode were pressed to be combined each other and the cathode metal foil was secured in a manner that it was also united with the aluminum foils at the leading metal portion.

0.1 mol/l of pyrrole and 0.1 ml/l of iron sulfate (III) as an oxidizer, and 0.05 mol of a Na salt with an alkylnaphthalenesulfonic acid ion as a dopant were dissolved in an aqueous solution containing 10 vol % of isopropyl alcohol to prepare a reaction solution. The above laminated body was impregnated with the reaction solution at 5 and then the temperature of the solution was raised to accelerate the reaction thereby forming an conducting polymer layer by polymerization on the surface of the dielectric layer and in the clearance between the cathode metal foil and the surface of the dielectric.

Then the laminated body on which the conducting polymer layer was formed was molded using a resin with the leading portion for the both electrodes being left unmolded and external electrodes were formed on the led both electrodes to manufacture an electrolytic capacitor with a rating of 6.5 V.

For comparison, an electrolytic capacitor was produced in the same manner as above except that a material produced by vapor-depositing carbon on an aluminum foil formed with through holes was used as the cathode metal foil.

In this example, the external surface of a sheet of aluminum foil used in every electrolytic capacitor was 3.3 mm' 3.7 mm in size.

In order to evaluate the responsiveness of each of the prepared electrolytic capacitors at high frequencies, the developing rate of capacitance at high frequencies to that at low frequencies, and the impedance at high frequencies corresponding to the equivalent series resistance were measured.

The capacitances of the prepared electrolytic capacitors were all 50 $\mu$F at 120 Hz and 46 $\mu$F at 100 kHz (the developing rate of capacitance: 92%). The impedances of the prepared electrolytic capacitors were about 12 m$\Omega$ at 400 kHz.

The reliability of each of the electrolytic capacitors was evaluated under a load of 12 V acceleratingly. As a consequence, the short circuit in the resulting electrolytic capacitor using, as the cathode metal film, a thin metal film supported by a plastic film occurred at a rate of 0% for 1,000 hours whereas the short circuit of that using a general metal film occurred at a rate of about 1.5% for 1,000 hours.

As aforementioned, it was confirmed that, according to this invention, the impedance was reduced especially at high frequencies and the responsiveness at high frequencies was improved. It was also confirmed that when the cathode metal foil was a thin metal film supported by a plastic film, high reliability could be ensured.

Example 7

An anode foil which was treated by chemical conversion process at a voltage of 30 V and to which an anode lead 12 was attached and a cathode foil which was treated by chemical conversion process at a voltage of 2 V and to which a cathode lead 14 was attached were overlapped via a separator and wound to prepare a capacitor element with a capacitance of 100 $\mu$F, which had the same structure as a general aluminum electrolytic capacitor. The inside of entire pores of the element was lightly coated in advance with polypyrrole by chemical oxidation polymerization. As shown in FIG. 11, a nickel plate as the electrode 21 for electrolytic oxidization polymerization was attached to the bottom of the element. The entire element was soaked in a polymerizing solution containing a pyrrole monomer in the same manner as in Example 1. Using the nickel metal attached to the bottom as an electrode for polymerization, current was allowed to flow through the solution within the spaces of the element whereby the clearances formed inside the element were filled with an conducting polymer layer by electrolytic oxidation polymerization.

Figure 12:
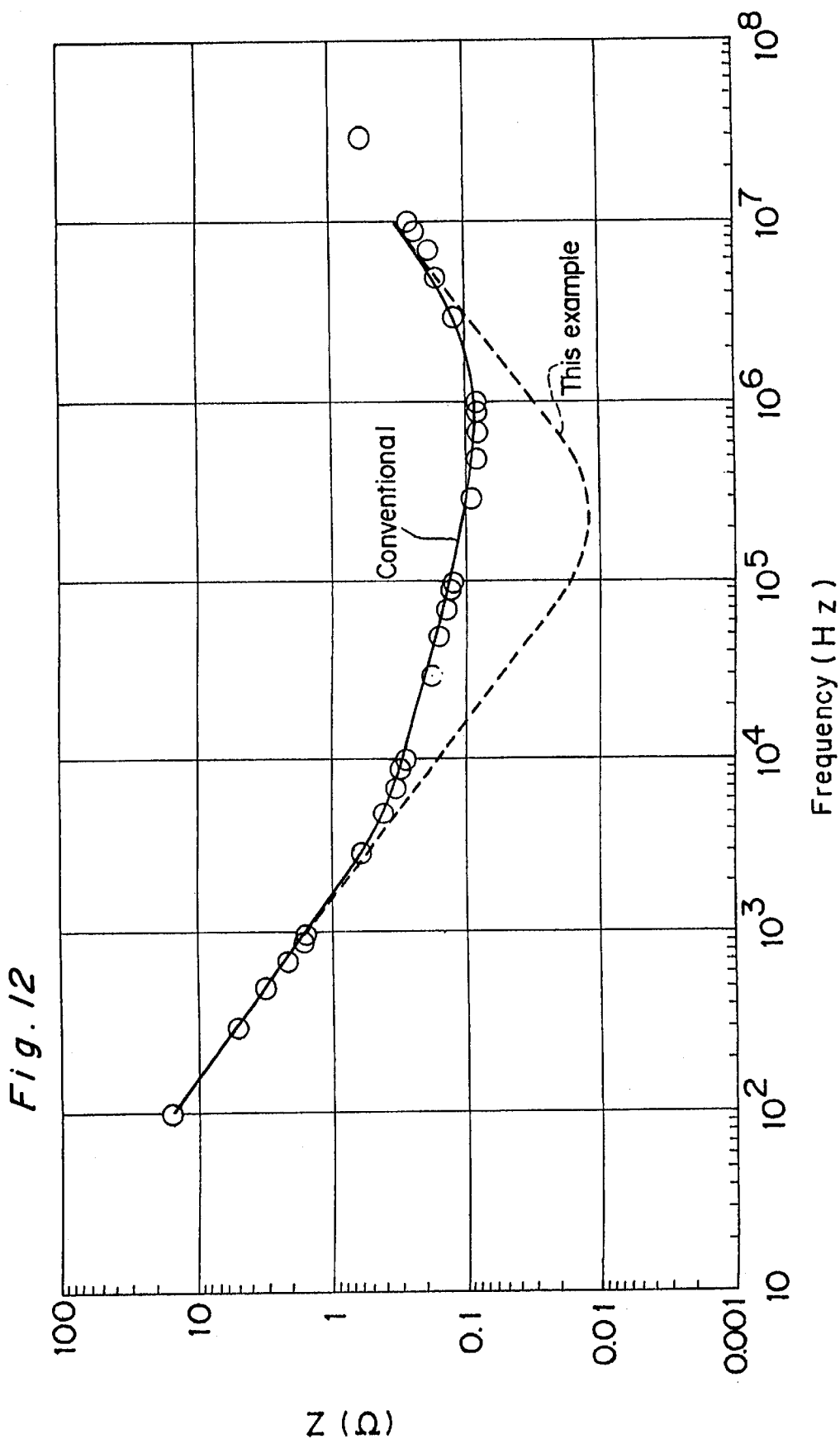
FIG. 12 is a graph showing the impedance characteristic of an aluminum electrolytic capacitor in the further example according to the present invention.

This capacitor had a capacitance of 95 $\mu$F at 120 Hz and a capacitance of 93 $\mu$F at 1 kHz. The impedance characteristic was, as shown in FIG. 12, improved and the impedance at the resonance point was one digit lower than a conventional tantalum electrolytic capacitor.

This example shows an instance of a polar capacitor with a cathode and anode which is the same system as a general aluminum electrolytic capacitor. A non pola-type is prepared using an anode foil instead of the cathode foil whereby the capacitance is reduced by half However, it is clear that a capacitor with a low impedance can be obtained.

Furthermore, this example shows an instance of a wound-type capacitor. However, even if capacitors having a structure in which an anode foil and a cathode foil are alternately laminated via a separator and each anode foil is electrically connected to each cathode through an conducting polymer layer, the same performances can be obtained.

As is clear from the aforementioned explanations, according to the present invention in which an conducting polymer film is grown directly from a cathode current collector by an electrolytic oxidation polymerization method and the cathode current collector is directly connected to the surface of the dielectric using an conducting polymer, a capacitor which is miniature and has a low impedance can be easily provided in an efficient manner. Even when an element in which an conducting polymer is formed on the surface of the dielectric in advance is joined with the cathode current collector using an conducting polymer, the cathode current collector is directly connected to the surface of the dielectric using an conducting polymer and hence a capacitor which is miniature and has a low impedance can be easily provided in an efficient manner. Also, a cathode current collector metal plate is used directly as a packaging case whereby the occupancy of the capacitor element in the casing can be increased, which contributes to an achievement of further miniaturization and increased capacitance.

According to the present invention, a cathode current collector is disposed adjacent and opposite to a porous valvular metal foil for anode. This structure ensures that the collecting area is enlarged and a cathode metal foil is directly joined with a dielectric oxide layer using an conducting polymer without interposing various binding layers (for example, a carbon paste layer and a silver paste layer) thereby reducing all impedance of the capacitor.

The cathode metal foil disposed adjacent to an anode metal foil may have a structure in which a metal thin film is formed on a plastic film. This structure gives an effective result that if the circuit would short, a metal thin film of the shorted circuit would vanish whereby the original characteristics would be restored and a highly reliable capacitor can be thereby provided.

According to the present invention, in a wound-type and laminated-type electrolytic capacitor, an electrode for electrolytic oxidation polymerization is attached to the entire surface perpendicular to a foil and a separator, an conducting polymer is grown directly from the attached electrode by electrolytic oxidation polymerization, and the conducting polymer is grown to the inside of the capacitor element. This structure enables it possible to fill the space within the element with the conducting polymer and an electrolytic capacitor with a low impedance can be provided.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A method for producing an electrolytic capacitor, comprising:
    forming a dielectric oxide layer on a porous body formed of a valvular metal for an anode;
    forming precedently a first conducting polymer layer by polymerizing on the surface of a cathode current collector comprising a plate or foil of a metal to face the porous body, wherein the surface of the cathode current collector on which the first conducting polymer is formed is roughened or porous, is provided with carbon particles embedded therein in contact with the first conducting polymer layer, or is provided with a carbon layer conductively fixed thereto in contact with the first conducting polymer layer;
    attaching the cathode current collector to the porous body; and
    joining the cathode current collector to the porous body by polymerizing a second conducting polymer layer so as to fill a clearance between the dielectric oxide layer on the porous body and the first conductive polymer layer on the cathode current collector.

2. A method for producing an electrolytic capacitor according to claim 1, wherein said joining the cathode current collector to the porous body comprises dipping the porous body and the cathode current collector in a solution containing a monomer to be polymerized into the second conducting polymer layer, and subjecting the monomer to electrolytic oxidation polymerization by applying a current in the solution interfused in the pores communicated to each other and passing through the porous body using the cathode current collector as an electrode allowing the second conducting polymer layer to grow from the surface of the cathode current collector and fill into the pores.

3. A method for producing an electrolytic capacitor according to claim 2, wherein prior to said attaching the cathode current collector and the porous body, a preliminary conducting polymer layer is formed on the dielectric oxide layer of the porous body.

4. A method for producing an electrolytic capacitor according to claim 3, wherein the preliminary conducting polymer layer is formed in the monomer solution containing no organic acid dopant by chemical oxidation polymerization.

5. A method for producing an electrolytic capacitor according to claim 1, wherein said joining the cathode current collector to the porous body comprises polymerizing the second conducting polymer layer to be filled in a clearance between the first conducting polymer of the cathode current collector and the dielectric oxide layer of the porous body by chemical oxidization polymerization.

6. A method for producing an electrolytic capacitor according to claim 1, wherein the first conducting polymer layer formed on the cathode current collector has a structure in which the most upper layer is softened.

7. A method for producing an electrolytic capacitor according to claim 1, wherein the first conducting polymer layer formed on the cathode current collector is formed by electrolytic oxidization polymerization method.

8. A method for producing an electrolytic capacitor according to claim 1, wherein the porous body for the anode is formed by laminating or winding one or more valvular metal porous foils and the cathode current collector is disposed on the laminated or wound porous body and perpendicular to the foil surface thereof.

9. A method for producing an electrolytic capacitor according to claim 1, wherein the porous body for the anode is formed by sintering a pressed compact of the powdery valvular metal.

10. A method for producing an electrolytic capacitor according to claim 1, wherein the porous body for the anode is a porous foil of the valvular metal.

11. A method for producing an electrolytic capacitor, comprising:
    forming a dielectric oxide layer on a porous body formed of a valvular metal for an anode;
    forming a conducting polymer layer by polymerizing on the dielectric layer of the porous body; and
    attaching the surface of a cathode current collector comprising a plate or foil of a metal to the conducting polymer layer of the porous body, wherein the surface of the cathode current collector on which the conducting polymer layer is joined is roughened or porous, is provided with carbon particles embedded therein in contact with the conducting polymer layer, or is provided with a carbon layer conductively fixed thereto in contact with the conducting polymer layer.

12. A method for producing an electrolytic capacitor according to claim 11, wherein the conducting polymer layer formed on the porous body on which the dielectric oxide layer is formed has a structure in which at least the most upper layer is softened.

13. A method for producing an electrolytic capacitor according to claim 11, wherein after said attaching the cathode current collector to the porous body which is formed with the conducting polymer layer, the method further comprises filling the clearance between the conducting polymer layer of the porous body and the cathode current collector with another conducting polymer by chemical oxidization polymerization.

14. A method for producing an electrolytic capacitor according to claim 11, wherein the porous body for the anode is a laminated or wound structure formed by laminating or winding one or more valvular metal porous foils and the cathode current collector is disposed on the end of the laminated or wound structure perpendicularly to the surface of the valvular metal porous foils.

15. A method for producing an electrolytic capacitor according to claim 11, wherein the porous body for the anode is formed by sintering a pressed compact of the powdery valvular metal.

16. A method for producing an electrolytic capacitor according to claim 11, wherein the porous body for the anode is a porous foil of the valvular metal.

17. A method for producing an electrolytic capacitor, comprising:
    forming a dielectric oxide layer on a porous body formed of a valvular metal for an anode;
    forming a first conducting polymer layer by polymerizing on the dielectric oxide layer of the porous body;
    forming a second conducting polymer layer by polymerizing on the surface of a cathode current collector to face the porous body, wherein the surface of the cathode current collector on which the second conducting polymer layer is attached is roughened or porous, is provided with carbon particles embedded therein in contact with the second conducting polymer, or is provided with a carbon layer conductively fixed thereto in contact with the second conducting polymer; and
    attaching the cathode current collector to the porous body to bring the second conducting polymer layer to the first conducting polymer layer.

18. A method for producing an electrolytic capacitor according to claim 17, wherein after said attaching the cathode current collector to the porous body which is formed with the first and second conducting polymer layers, the method further comprises filling the clearance between the first conducting polymer layer of the porous body and the second conducting polymer layer of the cathode current collector with a third conducting polymer by chemical oxidization polymerization.

19. A method for producing an electrolytic capacitor according to claim 17, wherein the first conducting polymer layer formed on the porous body on which the dielectric oxide layer is formed has a structure in which at least the most upper layer is softened.

20. A method for producing an electrolytic capacitor according to claim 17, wherein the second conducting polymer layer formed on the cathode current collector has a structure in which at least the most upper layer is softened.

21. A method for producing an electrolytic capacitor according to claim 17, wherein the second conducting polymer layer formed on the cathode current collector is formed by electrolytic oxidization polymerization method.

22. A method for producing an electrolytic capacitor according to claim 17, wherein the valvular metal porous body for the anode is a laminated or wound structure formed by laminating or winding one or more valvular metal porous foils and the cathode current collector is disposed on the end of the laminated or wound structure perpendicularly to the surface of the valvular metal porous foils.

23. A method for producing an electrolytic capacitor according to claim 17, wherein the porous body for the anode is formed by sintering a pressed compact of the powdery valvular metal.

24. A method for producing an electrolytic capacitor according to claim 17, wherein the porous body for the anode is a porous foil of the valvular metal.

25. A method for producing an electrolytic capacitor comprising:
    forming a dielectric oxide layer on the surface of a porous body of a valvular metal foil for an anode and the entire surface of pores thereof;
    treating the surface of a cathode current collector of a valvular metal foil to be roughened at a voltage of 1 to 5 V by chemical conversion process;
    laminating or winding both the porous body and the cathode current collector via a separator interposed therebetween to form a laminated or wound structure;
    attaching an electrode for electrolytic oxidation polymerization to an end of the laminated or wound structure perpendicularly to the surfaces of the cathode current collector and the porous body;
    soaking the laminated or wound structure to which the electrode is attached, in a solution containing a monomer to be polymerized into a conducting polymer; and
    applying a current through the solution interfused within the laminated or wound structure using the attached electrode as the anode for electrolytic oxidation polymerization to grow a conducting polymer layer into a clearance between the cathode current collector and the porous body by electrolytic oxidation polymerization, thereby filling the pores of the porous body with the conducting polymer layer.

26. A method for producing an electrolytic capacitor according to claim 25, wherein another conducting polymer layer is formed in advance by chemical oxidation polymerization on the entire surface of the dielectric oxide layer formed on the surface of the porous body before the conducting polymer layer is grown by electrolytic oxidation polymerization to fill the pores of the laminated or wound structure.

27. A method for producing a non-polar electrolytic capacitor comprising:
    forming a dielectric oxide layer on the surfaces of two porous bodies made of valvular metal foil and the entire surface of pores thereof;
    laminating or winding the two porous bodies via a separator interposed therebetween to form a laminated or wound structure;
    attaching an electrode for electrolytic oxidation polymerization to the end of the laminated or wound structure perpendicularly to the surfaces of the valvular metal porous bodies;
    soaking the laminated or wound structure, to which the electrode is attached, in a solution containing a monomer to be polymerized into a conducting polymer; and
    applying current through the solution interfused within the inside of the laminated or wound structure by using the attached electrode as an anode for electrolytic oxidation polymerization to grow a conducting polymer layer into a clearance between the porous bodies from the attached electrode, thereby filling the pores of the porous bodies with the conducting polymer layer.

28. A method for producing an electrolytic capacitor according to claim 27, wherein before the conducting polymer layer is grown by electrolytic oxidation polymerization, another conducting polymer layer is formed in advance by chemical oxidation polymerization on the surface of the dielectric oxide layer formed on the surfaces of the porous bodies to fill the pores inside the laminated or wound structure.

* * * * *